US010402376B2

(12) United States Patent
Luthra et al.

(10) Patent No.: US 10,402,376 B2
(45) Date of Patent: *Sep. 3, 2019

(54) SECURE CLOUD-BASED SHARED CONTENT

(71) Applicant: Box, Inc., Redwood City, CA (US)

(72) Inventors: Tanooj Luthra, San Diego, CA (US); Ritik Malhotra, San Jose, CA (US)

(73) Assignee: Box, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/024,748

(22) Filed: Jun. 30, 2018

(65) Prior Publication Data

US 2018/0307704 A1 Oct. 25, 2018

Related U.S. Application Data

(63) Continuation of application No. 15/140,330, filed on Apr. 27, 2016, now Pat. No. 10,013,431.

(Continued)

(51) Int. Cl.
*H04L 29/06* (2006.01)
*G06F 16/182* (2019.01)
(Continued)

(52) U.S. Cl.
CPC .............. *G06F 16/182* (2019.01); *G06F 9/46* (2013.01); *G06F 12/0891* (2013.01);
(Continued)

(58) Field of Classification Search
CPC combination set(s) only.
See application file for complete search history.

(56) References Cited

U.S. PATENT DOCUMENTS 6,512,529 B1 1/2003 Janssen
6,750,858 B1 6/2004 Rosenstein
(Continued)

OTHER PUBLICATIONS

Notice of Allowance dated Feb. 21, 2018 for U.S. Appl. No. 15/140,330.

(Continued)

*Primary Examiner* — Amir Mehrmanesh
(74) *Attorney, Agent, or Firm* — Vista IP Law Group, LLP

(57) ABSTRACT

Systems for managing content in a cloud-based service platform. Procedures for deduplication of a shared object in a cloud-based environment having one or more storage devices that store one or more files that are accessible by two or more entities. A computer-implemented method commences by generating a content-based encryption key for a shared object wherein the key is derived from one of the shared objects. The shared object is encrypted using the content-based encryption key to generate a content-based encrypted file. The content-based encrypted file is stored in a cloud-based storage system. A second or Nth entity and/or any number of users from the respective entities can upload the same file for shared storage, and before storing the same file for shared storage, a server in the cloud-based storage environment performs deduplication of the encrypted file across multiple entities by applying an intra-enterprise deduplicate directive or an inter-enterprise deduplicate directive.

16 Claims, 20 Drawing Sheets

Related U.S. Application Data

(60) Provisional application No. 62/154,658, filed on Apr. 29, 2015.

(51) Int. Cl.

| | | |
|---|---|---|
| *G06F 9/46* | (2006.01) | |
| *G06F 16/23* | (2019.01) | |
| *G06F 16/172* | (2019.01) | |
| *G06F 16/185* | (2019.01) | |
| *G06F 16/188* | (2019.01) | |
| *G06F 16/17* | (2019.01) | |
| *G06F 16/174* | (2019.01) | |
| *G06F 16/176* | (2019.01) | |
| *G06F 16/957* | (2019.01) | |
| *H04L 29/08* | (2006.01) | |
| *G06F 12/0891* | (2016.01) | |
| *G06F 12/122* | (2016.01) | |
| *H04N 19/40* | (2014.01) | |
| *G06F 12/1081* | (2016.01) | |
| *G06F 16/242* | (2019.01) | |
| *G06F 16/22* | (2019.01) | |
| *G06F 16/11* | (2019.01) | |

(52) U.S. Cl.
CPC ........ *G06F 12/1081* (2013.01); *G06F 12/122* (2013.01); *G06F 16/113* (2019.01); *G06F 16/172* (2019.01); *G06F 16/1727* (2019.01); *G06F 16/1748* (2019.01); *G06F 16/1774* (2019.01); *G06F 16/183* (2019.01); *G06F 16/185* (2019.01); *G06F 16/188* (2019.01); *G06F 16/196* (2019.01); *G06F 16/22* (2019.01); *G06F 16/23* (2019.01); *G06F 16/2443* (2019.01); *G06F 16/9574* (2019.01); *H04L 63/0428* (2013.01); *H04L 65/602* (2013.01); *H04L 65/607* (2013.01); *H04L 65/80* (2013.01); *H04L 67/06* (2013.01); *H04L 67/1097* (2013.01); *H04L 67/34* (2013.01); *H04N 19/40* (2014.11); *G06F 2212/1016* (2013.01); *G06F 2212/1044* (2013.01); *G06F 2212/154* (2013.01); *G06F 2212/463* (2013.01); *G06F 2212/60* (2013.01); *G06F 2212/657* (2013.01)

(56) References Cited

U.S. PATENT DOCUMENTS

| | | |
|---|---|---|
| 7,047,309 B2 | 5/2006 | Baumann |
| 7,694,065 B2 | 4/2010 | Petev |
| 7,975,018 B2 | 7/2011 | Unrau |
| 8,180,801 B2 | 5/2012 | Zhang |
| 8,380,868 B2 * | 2/2013 | Hiie .................. H04L 63/065 709/231 |
| 8,423,606 B1 | 4/2013 | Streeter |
| 8,489,549 B2 | 7/2013 | Guarraci |
| 8,527,549 B2 | 9/2013 | Cidon |
| 8,634,456 B2 | 1/2014 | Chen |
| 8,849,761 B2 | 9/2014 | Prahlad |
| 8,886,894 B2 | 11/2014 | Adi-Tabatabai |
| 8,948,258 B2 | 2/2015 | Chen |
| 9,015,470 B2 | 4/2015 | Losev |
| 9,210,085 B2 | 12/2015 | Harrison |
| 9,253,166 B2 | 2/2016 | Gauda |
| 9,288,510 B1 | 3/2016 | Yang |
| 9,313,510 B2 | 4/2016 | Shivadas |
| 9,319,678 B2 | 4/2016 | Coudurier |
| 9,332,050 B2 | 5/2016 | Collard |
| 9,384,209 B2 | 7/2016 | Kim |
| 9,392,304 B2 | 7/2016 | Coudurier |
| 9,444,695 B2 | 9/2016 | Dutta |
| 9,544,348 B2 | 1/2017 | Devereaux |
| 9,571,463 B2 * | 2/2017 | Strayer .............. H04L 63/0428 |
| 9,621,613 B1 | 4/2017 | Huang |
| 9,628,268 B2 | 4/2017 | Kiang et al. |
| 9,715,428 B1 | 7/2017 | Morshed |
| 9,756,022 B2 | 9/2017 | Amiri et al. |
| 9,811,532 B2 | 11/2017 | Parkison et al. |
| 9,852,361 B1 | 12/2017 | Prasad |
| 9,940,241 B1 | 4/2018 | Mehrotra |
| 9,973,564 B2 | 5/2018 | Dong |
| 2004/0100937 A1 | 5/2004 | Chen |
| 2004/0107319 A1 | 6/2004 | D'Orto |
| 2006/0059509 A1 | 3/2006 | Huang |
| 2007/0076626 A1 | 4/2007 | Wise |
| 2008/0098212 A1 * | 4/2008 | Helms ................ H04L 63/0428 713/155 |
| 2008/0098237 A1 | 4/2008 | Dung |
| 2009/0016445 A1 | 1/2009 | Gao |
| 2009/0310669 A1 | 12/2009 | Konoshima |
| 2010/0070608 A1 | 3/2010 | Hosur |
| 2010/0211690 A1 | 8/2010 | Pakzad |
| 2010/0268840 A1 | 10/2010 | Hiie |
| 2010/0332479 A1 | 12/2010 | Prahlad |
| 2011/0066668 A1 | 3/2011 | Guarraci |
| 2011/0096828 A1 | 4/2011 | Chen |
| 2011/0194613 A1 | 8/2011 | Chen |
| 2011/0231519 A1 | 9/2011 | Luby |
| 2011/0231569 A1 | 9/2011 | Luby |
| 2011/0238789 A1 | 9/2011 | Luby |
| 2011/0239078 A1 | 9/2011 | Luby |
| 2011/0246616 A1 | 10/2011 | Ronca |
| 2011/0320733 A1 | 12/2011 | Sanford |
| 2012/0023249 A1 | 1/2012 | Chen |
| 2013/0013803 A1 | 1/2013 | Bichot |
| 2013/0110961 A1 | 5/2013 | Jadhav |
| 2013/0117418 A1 | 5/2013 | Mutton |
| 2013/0138810 A1 | 5/2013 | Binyamin |
| 2013/0223509 A1 | 8/2013 | Tweedale |
| 2013/0238785 A1 | 9/2013 | Hawk |
| 2013/0339470 A1 | 12/2013 | Jeswani |
| 2014/0006354 A1 | 1/2014 | Parkison et al. |
| 2014/0118379 A1 | 5/2014 | Hakura |
| 2014/0119457 A1 | 5/2014 | Macinnis |
| 2014/0140417 A1 | 5/2014 | Shaffer |
| 2014/0153909 A1 | 6/2014 | Macinnis |
| 2014/0177733 A1 | 6/2014 | Coudurier |
| 2014/0181864 A1 | 6/2014 | Marshall |
| 2014/0201141 A1 | 7/2014 | Vibhor et al. |
| 2014/0269932 A1 | 9/2014 | Su |
| 2014/0281009 A1 | 9/2014 | Moorthy |
| 2014/0282771 A1 | 9/2014 | Tumuluru |
| 2014/0324929 A1 | 10/2014 | Mason, Jr. |
| 2014/0351455 A1 | 11/2014 | McCormick |
| 2014/0380376 A1 | 12/2014 | Schmidt |
| 2015/0039726 A1 | 2/2015 | Hoffert |
| 2015/0067753 A1 | 3/2015 | Shemesh |
| 2015/0098690 A1 | 4/2015 | Abbate |
| 2015/0227602 A1 | 8/2015 | Ramu |
| 2015/0372939 A1 | 12/2015 | Redler, IV |
| 2016/0014095 A1 | 1/2016 | Strayer |
| 2016/0065364 A1 | 3/2016 | Amiri et al. |
| 2016/0103851 A1 | 4/2016 | Dimitrov |
| 2016/0119657 A1 | 4/2016 | Sun |
| 2016/0323351 A1 | 4/2016 | Lurhra et al. |
| 2016/0173900 A1 | 6/2016 | Lee |
| 2016/0234282 A1 | 8/2016 | Lederer |
| 2016/0321287 A1 | 11/2016 | Luthra et al. |
| 2016/0321288 A1 | 11/2016 | Malhotra et al. |
| 2016/0321291 A1 | 11/2016 | Malhotra et al. |
| 2016/0321311 A1 | 11/2016 | Tallamraju et al. |
| 2016/0323358 A1 | 11/2016 | Malhotra et al. |
| 2017/0134344 A1 | 5/2017 | Wu |
| 2017/0141921 A1 | 5/2017 | Berger |

OTHER PUBLICATIONS

"Data deduplication", Wikipedia, URL: https://en.wikipedia.org/wiki/Data_deduplication, Mar. 6, 2016, Accessed on Apr. 10, 2016.

(56) References Cited

OTHER PUBLICATIONS

"REST Docs | Bitcasa Developer Center", URL: https://developer.bitcasa.com/docs/rest/, Sep. 2015, Accessed on Jan. 15, 2016.
Apache Thrift Wikipedia, URL: https://en.wikipedia.org/wiki/Apache_Thrift, Oct. 27, 2015, Accessed on Jan. 26, 2016.
Chiu, David, et al., "Elastic Cloud Caches for Accelerating Service-Oriented Computations", SC '10, New Orleans, LA, Nov. 13-19, 2010, 11 pages.
Chun, Byung-Gon, et al., "CloneCloud: Elastic Execution between Mobile Device and Cloud", EuroSys '11, Salzburg, Austria, Apr. 10-13, 2011, pp. 301-314.
Haining, Theodore R., et al., "Management Policies for Non-Volatile Write Caches", PCCC 1999, Scottsdale, AZ, Feb. 12, 1999, pp. 321-328.
Kim, Hwanju, et al., "XHive: Efficient Cooperative Caching for Virtual Machines", IEEE Transactions on Computers, vol. 60, No. 1, Jan. 2011, pp. 106-119.
Kim, Hyeon Gyu, et al., "Time-slide window join over data streams", Journal of Intelligent Information Streams, vol. 43, Issue 2, Oct. 2014, pp. 323-347.
Li, Jin, et al., "AdaptWID: An Adaptive, Memory-Efficient Window Aggregation Implementation", IEEE Internet Computing, vol. 12, Issue 6, Nov.-Dec. 2008, pp. 22-29.
Li, Jin, et al., "Semantics and Evaluation Techniques for Window Aggregates in Data Streams", ACM SIGMOD 2005, Baltimore, MD, Jun. 14-16, 2005, pp. 311-322.
Mancuso, Renato, et al., "Real-Time Cache Management Framework for Multi-core Architectures", RTAS 2013, Philadelphia, PA, Apr. 9-11, 2013, pp. 45-54.
Mao, Huajian, et al., "Wukong: A cloud-oriented file service for mobile Internet devices", Journal of Parallel and Distributed Computing, vol. 72, Issue 2, Feb. 2012, pp. 171-184.
Non-Final Office Action dated Feb. 23, 2018 for U.S. Appl. No. 15/140,292.
Non-Final Office Action dated Apr. 18, 2018 for U.S. Appl. No. 15/140,310.
Non-Final Office Action dated May 15, 2018 for U.S. Appl. No. 15/140,270.
Notice of Allowance dated Mar. 14, 2018 for U.S. Appl. No. 15/140,248.
Patroumpas, Kostas, et al., "Maintaining consistent results of continuous queries under diverse window specifications", Information Systems, vol. 36, Issue 1, Mar. 2011, pp. 42-61.
Patroumpas, Kostas, et al., "Window Specification over Data Streams", EDBT 2006 Workshops, LNCS 4254, © IFIP International Federation for Information Processing © 2006, pp. 445-464.
Peng, Chunyi, et al., "VON: Virtual Machine Image Distribution Network for Cloud Data Centers", INFOCOM 2012, Orlando, FL, Mar. 25-30, 2012, pp. 181-189.
Saxena, Moh it, et al., "Flash Tier: A Lightweight, Consistent and Durable Storage Cache", EuroSys '12, Bern, Switzerland, Apr. 10-13, 2012, pp. 267-280.
Stefanov, Emil, et al., "Iris: A Scalable Cloud File System with Efficient Integrity Checks", ACSAC '12, Orlando, FL, Dec. 3-7, 2012, pp. 229-238.
Wang, Haiyang, et al., "On the Impact of Virtualization on Dropbox-like Cloud File Storage/Synchronization Services", IWQoS'12, Coimbra, Portugal, Jun. 4-5, 2012, Article No. 11, 9 pages.
Zhou, Yuanyuan, et al., "Second-Level Buffer Cache Management", IEEE Transactions on Parallel and Distributed Systems, vol. 15, No. 6, Jun. 2004, pp. 505-519.
Final Office Action dated Aug. 1, 2018 for U.S. Appl. No. 15/140,292.
Final Office Action dated Oct. 30, 2018 for U.S. Appl. No. 15/140,270.
Final Office Action dated Nov. 9, 2018 for U.S. Appl. No. 15/140,357.
Notice of Allowance dated Jun. 15, 2018 for U.S. Appl. No. 15/140,179.
Notice of Allowance dated Sep. 6, 2018 for U.S. Appl. No. 15/140,310.
Final Office Action dated Feb. 6, 2019 for U.S. Appl. No. 15/140,357.
Notice of Allowance dated Apr. 5, 2019 for U.S. Appl. No. 15/140,270.
Non-Final Office Action dated Jun. 3, 2019 for U.S. Appl. No. 15/140,357.
Non-Final Office Action dated Jun. 13, 2019 for U.S. Appl. No. 15/140,292.

\* cited by examiner

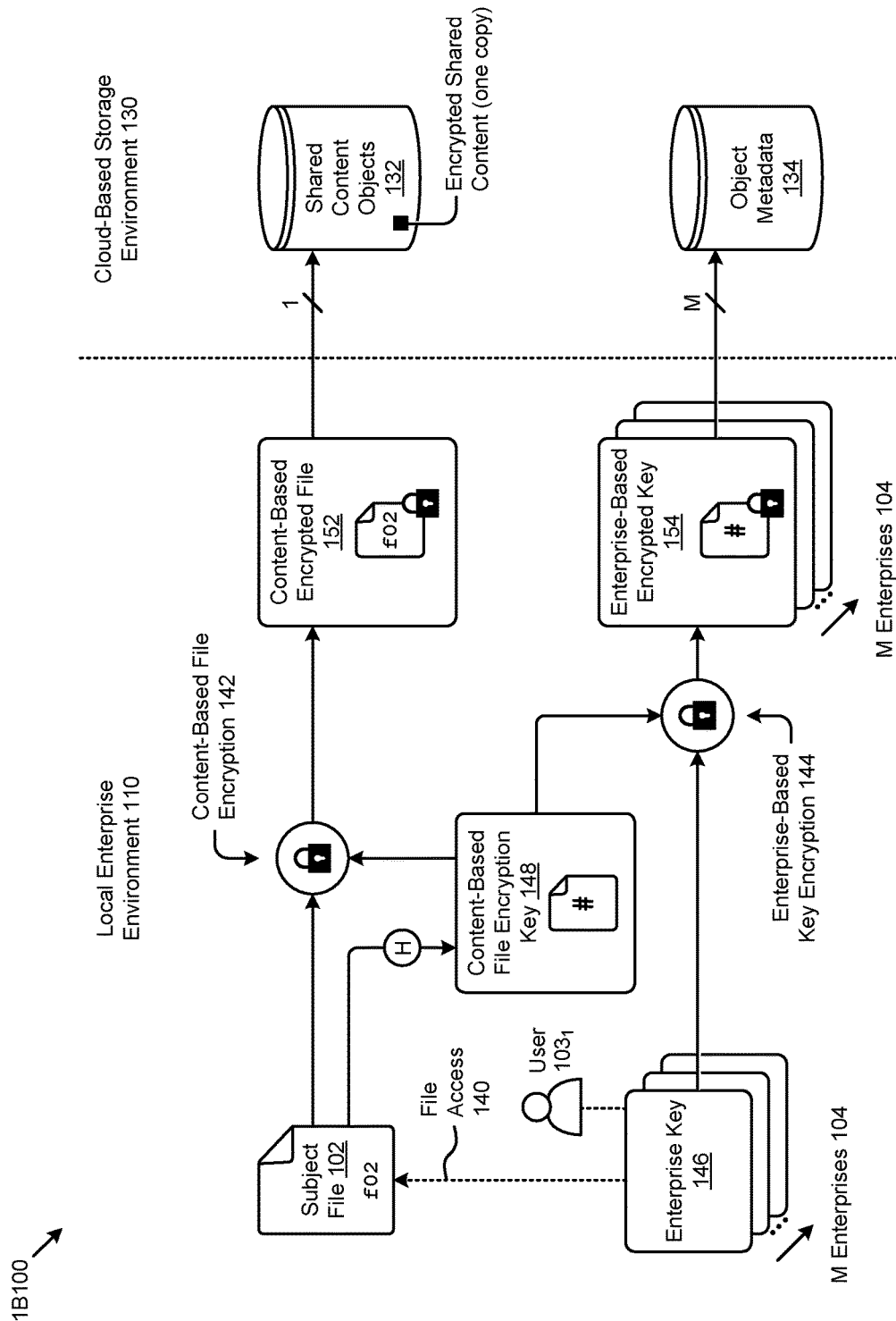
FIG. 1B1

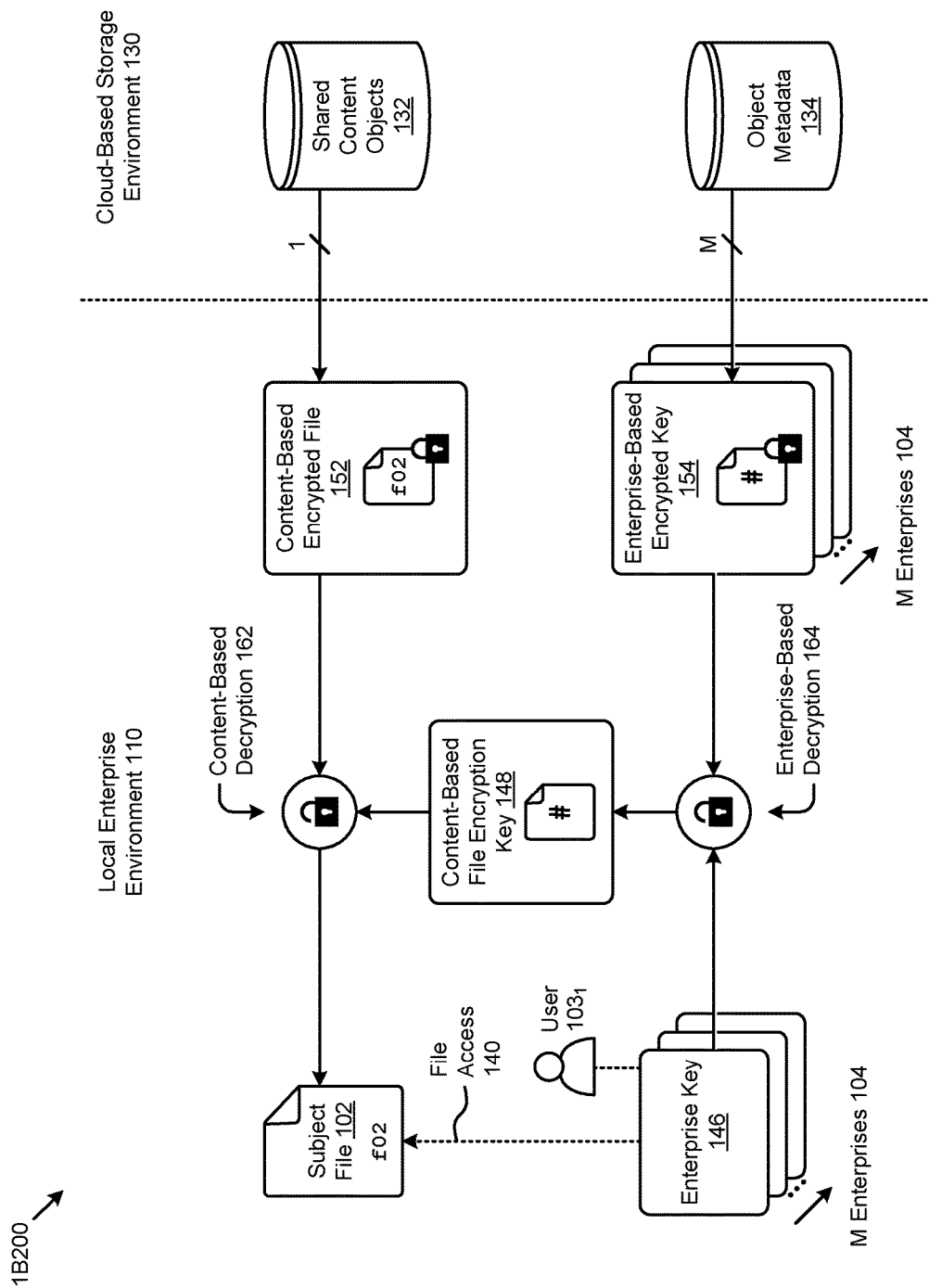
FIG. 1B2

SECURE CLOUD-BASED SHARED CONTENT

CROSS-REFERENCE TO RELATED APPLICATION(S)

This present application is a continuation of U.S. application Ser. No. 15/140,330 filed on Apr. 27, 2016, which claims the benefit of priority from U.S. Provisional Application No. 62/154,658, filed on Apr. 29, 2015, which are hereby incorporated by reference in their entirety.

FIELD

This disclosure relates to managing content in a cloud-based service platform, and more particularly to techniques for multiple key encryption for deduplication of shared content in cloud-based environment.

BACKGROUND

The proliferation of cloud based services and platforms continues to increase. Specifically, cloud-based content management services and platforms have impacted the way personal and corporate electronically stored information (e.g., files, images, videos, objects, etc.) are stored, and has also impacted the way such personal and corporate content is shared and managed. Such cloud-based platforms facilitate securely sharing large volumes of content among trusted collaborators on a variety of user devices such as mobile phones, tablets, laptop computers, desktop computers, and/or other devices. For example, a large enterprise with thousands of users (e.g., employees) and many terabytes of content might use a cloud-based content storage platform to efficiently and securely facilitate content access to various individual users and/or collaborative groups of users. In such cases, a user can access a large volume of objects stored in the cloud-based platform from a user device that might store merely a small portion of that volume locally. Such access can enable multiple users (e.g., collaborators) to manage certain shared objects for various collaborative purposes (e.g., co-development, audience presentation, etc.). In some cases, one enterprise might invite one or more other enterprises to collaborate on certain shared content. In such cases, the cloud-based content storage platform can implement various techniques, such as encryption, to protect the shared content as it is being accessed, managed, and/or stored by the various enterprises and/or enterprise users.

Unfortunately, legacy techniques for encrypting cloud-based shared content objects can be limited at least as pertaining to deduplication of shared content objects. Specifically, certain legacy approaches might encrypt a shared file accessed by a first enterprise with a file encryption key generated by the first enterprise to facilitate later access by the first enterprise. Another instance of the shared file might further be encrypted by a second enterprise with a second file encryption key generated by the second enterprise. In such approaches, two copies (e.g., a duplication) of the shared file might be stored on a remote file storage system. As the number of collaborating enterprises and/or collaborating enterprise users increases, so does the number of copies (e.g., duplications) of the shared file stored on the remote file storage system, resulting in an increased use of storage resources. The multiple duplications can further precipitate challenges in managing conflicts among the various instances of the shared file. In this case, additional computing resources can be required to detect and/or remediate conflicts among the multiple duplications of the shared file.

What is needed is a technique or techniques to improve over legacy and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for multiple key encryption for deduplication of shared content in a highly collaborative cloud-based environment, which techniques advance the relevant technologies to address technological issues with legacy approaches. More specifically, the present disclosure provides a detailed description of techniques used in systems, methods, and in computer program products for multiple key encryption for deduplication of shared content in a highly collaborative cloud-based environment. Certain embodiments are directed to technological solutions for implementing content-based file encryption and enterprise-based file decryption to facilitate deduplication of cloud-based shared content securely accessed by multiple collaborators.

The disclosed embodiments modify and improve over legacy approaches. In particular, the herein-disclosed techniques provide technical solutions that address the technical problems attendant to duplication of secure shared content stored in highly collaborative cloud-based storage systems. Such technical solutions serve to reduce the demand for computer storage (e.g., persistent storage), reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high-performance computing as well as advances in various technical fields related to data storage.

Further details of aspects, objectives, and advantages of the technological embodiments are described herein and in the following descriptions, drawings and claims.

BRIEF DESCRIPTION OF THE DRAWINGS

The drawings described below are for illustration purposes only. The drawings are not intended to limit the scope of the present disclosure.

FIG. 1B1 presents a multiple key encryption technique used to facilitate deduplication of shared content in a highly collaborative cloud-based environment, according to some embodiments.

FIG. 1B2 presents a multiple key decryption technique as applied to shared content in a highly collaborative cloud-based environment, according to some embodiments.

DETAILED DESCRIPTION

Figure 1A:
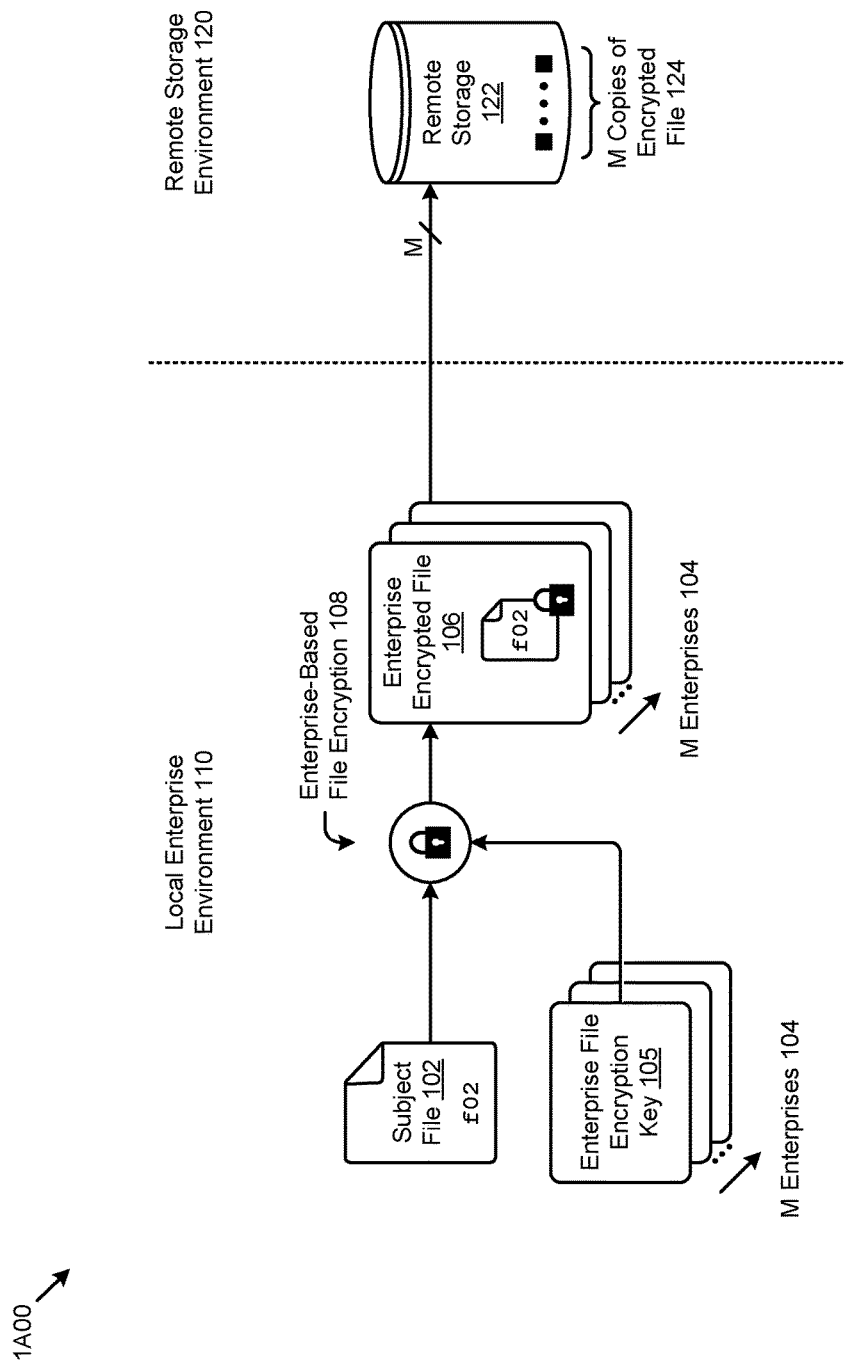
FIG. 1A illustrates a file encryption technique.

Some embodiments of the present disclosure address problems pertaining to duplication of secure shared content stored in a highly collaborative cloud-based storage system. Some embodiments are directed to approaches for implementing content-based file encryption in combination with enterprise-based file decryption to facilitate deduplication of cloud-based shared content that is securely accessed by multiple collaborators across multiple enterprises. The accompanying figures and discussions herein present example environments, systems, methods, and computer program products that implement or facilitate multiple key encryption of shared content.

Overview

Disclosed herein are techniques that implement or facilitate content-based file encryption and enterprise-based file decryption of cloud-based shared content that can be securely accessed by multiple collaborators across multiple enterprises. Specifically, in some embodiments, a hash key of a shared file can be used as a key to encrypt the shared file to provide a content-based encrypted shared file for storage in a cloud-based shared content storage system. The hash key of the shared file can be itself be encrypted with an enterprise-based key associated with each respective enterprise that is provisioned access to the shared file. Such enterprises can comprise one or many users. The resulting enterprise-based encrypted file hash key can be used by the associated enterprise users to decrypt the content-based encrypted shared file for collaboration and/or other object access purposes. In certain embodiments, use of the hash key in combination with an enterprise key eliminates the need for the cloud-based shared content storage system to store the shared file multiple times (e.g., once for each enterprise). In some embodiments, any of the foregoing techniques can be implemented within a local user device and/or within the cloud-based shared content storage system. In some embodiments, an encryption engine in a virtual file system can facilitate any of the herein disclosed techniques.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Example Embodiments

FIG. 1A illustrates a file encryption technique 1A00. As an option, one or more variations of file encryption technique 1A00 or any aspect thereof may be implemented in the context of the architecture and functionality of the embodiments described herein. The file encryption technique 1A00 or any aspect thereof may be implemented in any environment.

Specifically, as shown, FIG. 1A presents a local enterprise environment 110 interacting with a remote storage environment 120. A subject file 102, such as file f02, might be encrypted by one or more users from one or more enterprises (e.g., M enterprises 104) in the local enterprise environment 110 for storage in a remote storage 122 in remote storage environment 120. For example, the users associated with a given enterprise might be provisioned a file access to the file f02. Specifically, the users and/or enterprise might be an owner and/or a collaborator of file f02. The users might further be provided an enterprise file encryption key 105 unique to the enterprise associated with the users. As illustrated, other enterprises comprising a set of M enterprises 104 can have a respective unique instance of enterprise file encryption key 105.

The enterprise file encryption key 105 can be used to facilitate encryption of file f02. More specifically, enterprise file encryption key 105 can be used to implement an enterprise-based file encryption 108 to produce an instance of an enterprise encrypted file 106. As illustrated, a respective instance of enterprise encrypted file 106 can be produced for each of the enterprises comprising the set of M enterprises 104. To facilitate access to enterprise encrypted file 106 by the respective enterprise and/or users of the respective enterprise, the instances of enterprise encrypted file 106 for each enterprise (e.g., M copies of encrypted file 124) might be stored in remote storage 122. In such cases, remote storage 122 can comprise multiple copies (e.g., M duplications) of file f02 underlying the multiple instances of enterprise encrypted file 106. As the number of collaborating enterprises and/or collaborating enterprise users increases (e.g., M increases), so does the number of duplications of file f02 (e.g., shared file) stored in remote storage environment 120, resulting in an increased use of storage resources (e.g., an increase in remote storage 122). The multiple duplications can further precipitate challenges in managing conflicts among the various instances of file f02 accessed by the users and/or enterprises. In such cases, additional computing resources might be required to detect and/or remediate conflicts among the underlying instance of file f02 pertaining to the multiple instances of the enterprise encrypted file 106 stored in remote storage environment 120.

The herein disclosed techniques can address the foregoing technical problems attendant to duplication of secure shared content (e.g., file f02) stored in a remote storage environment 120 accessed by a large number of collaborators. Embodiments of such techniques are discussed in the following and herein.

FIG. 1B1 presents a multiple key encryption technique 1B100 used to facilitate deduplication of shared content in a highly collaborative cloud-based environment. As an option, one or more variations of multiple key encryption technique 1B100 or any aspect thereof may be implemented in the context of the architecture and functionality of the embodiments described herein. The multiple key encryption technique 1B100 or any aspect thereof may be implemented in any environment.

As shown, the multiple key encryption technique 1B100 shown in FIG. 1B1 can be implemented in a local enterprise environment 110 that interacts with a cloud-based storage environment 130. Multiple enterprises within local enterprise environment 110 can interact with the cloud-based storage environment 130 for collaboration over a set of shared content objects 132. The collaboration can be internal to a given enterprise (e.g., among users in the enterprise) or can be between two or more enterprises. A set of object metadata 134 characterizing shared content objects 132 can further be used to facilitate such collaboration and/or other capabilities implemented in the cloud-based storage environment 130. An enterprise can comprise one or multiple sub-entities or users such as user $103_1$. An enterprise can designate multiple entities (e.g., a branch office, a department, a subsidiary, a computer or device, etc.). As examples, an enterprise might designate an entity or user device, which in turn might be provisioned for access to a subject file. In some cases, the file access 140 can be characterized by an association between an enterprise key 146 and the file f02. Specifically, the file access 140 might be authorized at cloud-based storage environment 130 based on login credentials from user $103_1$ that link user $103_1$ (e.g., an employee of enterprise A) to enterprise key 146 (e.g., associated with enterprise A). Other users from a set of M enterprises 104 collaborating on file f02 can be associated with a respective unique instance of enterprise key 146.

While multiple instances of the file f02 might be managed by multiple users across multiple enterprises, deduplication of securely accessed instances of the file f02 can be facilitated by the multiple key encryption technique 1B100 and/or other herein disclosed techniques. Specifically, a content-based file encryption key 148 can be generated from subject file 102. For example, content-based file encryption key 148 can be based, at least in part, on a hash of the file f02. The hash can be performed by implementing any known hashing algorithm (e.g., MD5, SHA, etc.). The content-based file encryption key 148 can be used to encrypt the file f02. Such a content-based file encryption 142 can produce a content-based encrypted file 152. The content-based file encryption key 148 can further be encrypted using enterprise key 146. Such an enterprise-based key encryption 144 can produce an enterprise-based encrypted key 154.

While a respective instance of the enterprise-based encrypted key 154 can be produced for each of the enterprises comprising the set of M enterprises 104, merely one instance of the content-based encrypted file 152 associated with shared file f02 can be generated. This approach facilitates an inherent deduplication of the content-based encrypted file 152 stored in shared content objects 132. The enterprise-based encrypted key 154 associated with user $103_1$ and/or the enterprise associated with user $103_1$ can be stored in object metadata 134 to facilitate certain object access operations, such as file decryption, as described as pertaining to FIG. 1B2.

FIG. 1B2 presents a multiple key decryption technique 1B200 as applied to shared content in a highly collaborative cloud-based environment. As an option, one or more variations of multiple key decryption technique 1B200 or any aspect thereof may be implemented in the context of the architecture and functionality of the embodiments described herein. The multiple key decryption technique 1B200 or any aspect thereof may be implemented in any environment.

As shown, the multiple key decryption technique 1B200 shown in FIG. 1B2 can be implemented in a local enterprise environment 110 that interacts with a cloud-based storage environment 130. Specifically, user $103_1$ might issue a request from local enterprise environment 110 to cloud-based storage environment 130 to access subject file 102 (e.g., file f02). The cloud-based storage environment 130 might authorize file access 140 for user $103_1$ based at least in part on enterprise key 146 associated with user $103_1$. Responsive to such authorization, the content-based encrypted file 152 associated with file f02 can be downloaded to user $103_1$ in local enterprise environment 110 from shared content objects 132 in cloud-based storage environment 130. The enterprise-based encrypted key 154 associated with subject file f02 and enterprise key 146 can also be downloaded to user $103_1$.

Enterprise key 146 can be used to decrypt enterprise-based encrypted key 154 and the content-based file encryption key 148 can further be used to decrypt the content-based encrypted file. As shown, the enterprise-based decryption operations (e.g., see the enterprise-based decryption 164) produce the content-based file encryption key 148. Then content-based decryption operations (e.g., see the content-based description 162) can be used to decrypt the content-based encrypted file 152. Such a content-based decryption 162 can produce subject file 102 (e.g., file f02) for access by user $103_1$. As described, the multiple key decryption technique 1B200 and/or other herein disclosed techniques can facilitate secure access by multiple enterprises and/or users of such enterprises to a deduplicated instance of shared file (e.g., file f02) stored in cloud-based storage environment 130. In some embodiments, a virtual file system can be implemented to perform certain operations pertaining to the multiple key encryption technique 1B100, and/or a virtual file system can be implemented to perform certain operations pertaining to the multiple key decryption technique 1B200. One embodiment of such a virtual file system is discussed as shown and discussed as pertaining to FIG. 2A and FIG. 2B.

Figure 2A:
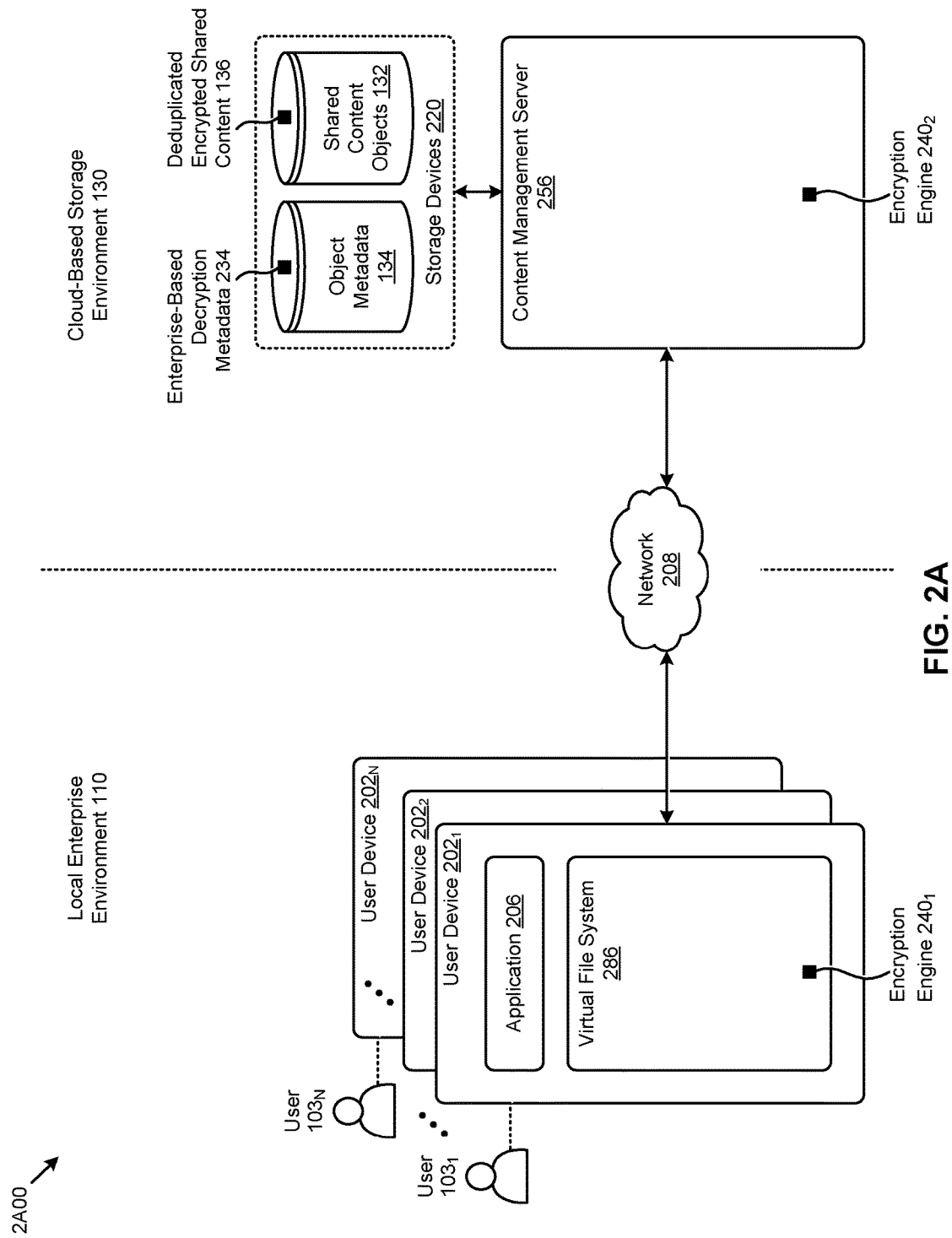
FIG. 2A and FIG. 2B present interconnection diagrams showing communications between system components that cooperate to implement multiple key encryption for deduplication of shared content in a highly collaborative cloud-based environment, according to an embodiment.

FIG. 2A presents an interconnection diagram 2A00 showing communications between system components that cooperate to implement multiple key encryption for deduplication of shared content in a highly collaborative cloud-based environment. As an option, one or more variations of interconnection diagram 2A00 or any aspect thereof may be implemented in the context of the architecture and functionality of the embodiments described herein. The interconnection diagram 2A00 or any aspect thereof may be implemented in any environment.

FIG. 2A presents various system components in local enterprise environment 110 and cloud-based storage environment 130 that can be used to implement a virtual file system 286 to facilitate the herein disclosed techniques for multiple key encryption for deduplication of shared content in a highly collaborative cloud-based environment. Specifically, each instance of various user devices (e.g., user device $202_1$, user device $202_2$, ..., user device $202_N$) operated by a respective user (e.g., user $103_1$, ..., user $103_N$) can run certain applications that can interface with a local instance of virtual file system 286. In other embodiments, the user device can interface with any facility that provides techniques for multiple key encryption over shared content.

More specifically, user device $202_1$ operated by user $103_1$ is shown running an application 206 that interacts with virtual file system 286. In some cases, the primary storage for objects managed (e.g., created, viewed, edited, etc.) might be implemented across a network 208 in cloud-based storage environment 130. For example, certain instances of cloud-based storage environment 130 can be embodied as a cloud-based and/or SaaS-based storage management architecture having one or more instances of storage devices 220 managed by a content management server 256. The content management server 256 can represent the various computing devices that carry out the operations implemented in cloud-based storage environment 130.

The storage devices 220 can comprise any combination of hardware and software that can provide access to the data (e.g., content, objects, etc.) stored on storage devices 220. For example, storage devices 220 might be implemented as computer memory operatively managed by an operating system (OS), hard disk drives, solid-state drives, networked attached storage, storage area networks, cloud-based storage, and/or any other type of storage facility and/or architecture that is capable of storing data. The data in storage devices 220 can be implemented as any type of data objects and/or files comprising shared content objects 132. The object metadata 134 stored in storage devices 220 can be used to characterize certain attributes (e.g., unique identifier, location, version, permissions, access rules, etc.) pertaining to a given object from shared content objects 132. In some cases, other data might be stored in storage devices 220 to facilitate the cloud-based storage operations.

According to the herein disclosed techniques, certain portions of virtual file system 286 (e.g., comprising a virtual file system module) can be delivered to user device $202_1$ to facilitate multiple key encryption for deduplication of shared content objects 132 in a highly collaborative instance of cloud-based storage environment 130. Specifically, in certain embodiments, components of an encryption engine (e.g., encryption engine $240_1$, encryption engine $240_2$) can facilitate storing just one instance of a content-based encrypted file 152 associated with each shared file in a collection of deduplicated encrypted shared content 136 in shared content objects 132. Further, the encryption engine can manage a set of enterprise-based decryption metadata 234 in object metadata 134. For example, enterprise-based decryption metadata 234 can comprise various attributes (e.g., enterprise-based encrypted keys, enterprise access permissions, etc.) corresponding to the enterprises and/or the enterprise users (e.g., user $103_1$) collaborating on the shared files to facilitate certain operations such as file decryption.

Figure 2B:
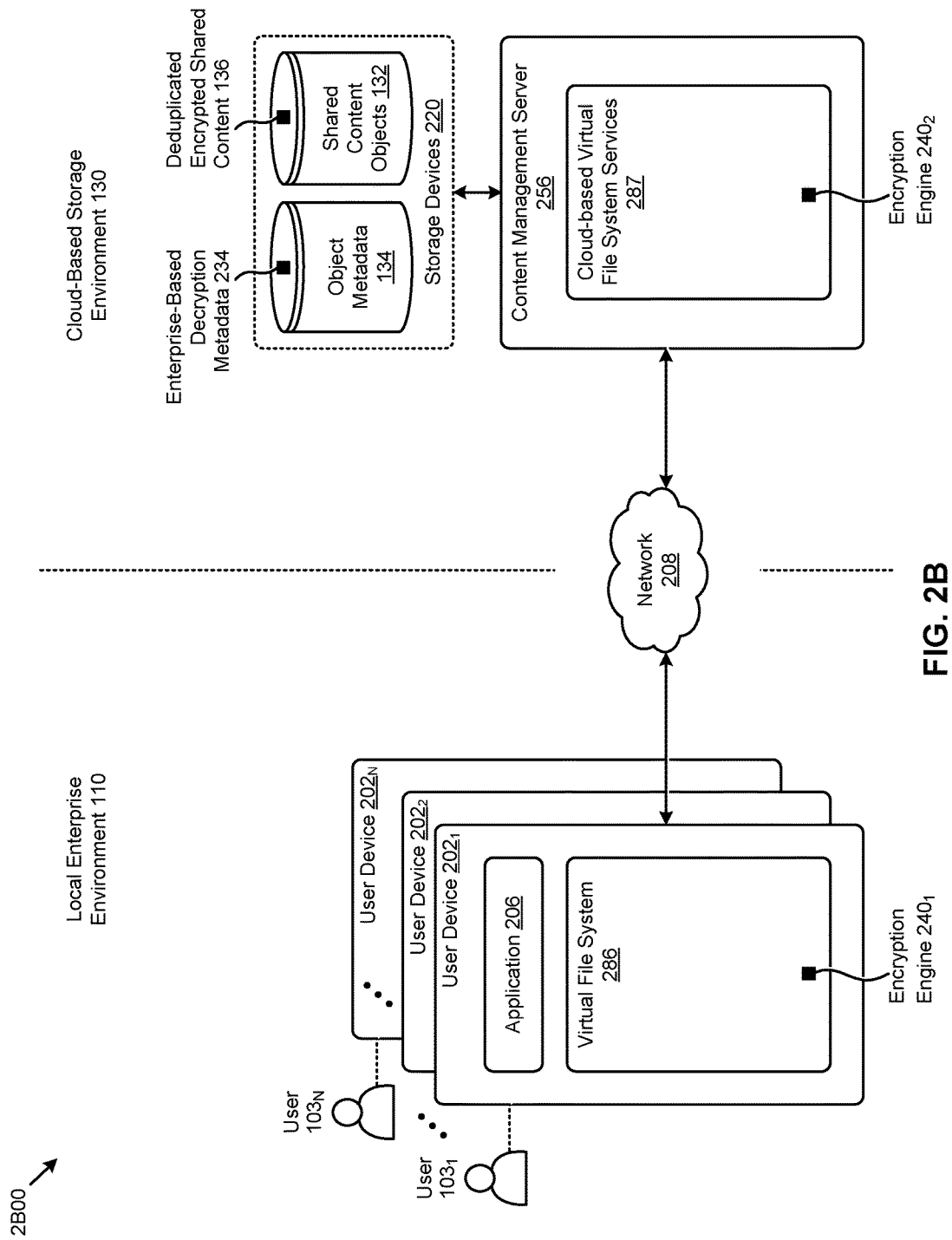

FIG. 2B presents an interconnection diagram 2B00 showing communications between system components that cooperate to implement multiple key encryption for deduplication of shared content in a highly collaborative cloud-based environment. As an option, one or more variations of interconnection diagram 2B00 or any aspect thereof may be implemented in the context of the architecture and functionality of the embodiments described herein. The interconnection diagram 2B00 or any aspect thereof may be implemented in any environment.

As shown, the virtual file system 286 in the local enterprise environment 110 communicates over a network 208 with components within the cloud-based storage environment 130. In particular the virtual file system 286 can interact with (e.g., send and receive messages, access URLs, perform application interface I/O, etc.) the cloud-based virtual file system services 287. The cloud-based virtual file system services 287 can respond to any commands or messages suited for facilitating operation of the virtual file system 286.

The system components of FIG. 2A and FIG. 2B present merely some partitioning examples. The specific examples shown are purely exemplary, and other partitioning is reasonable. Several embodiments of environments, flows and protocols supporting such systems, subsystems, and/or partitionings for implementing the herein disclosed techniques is shown in FIG. 3A, FIG. 3B, FIG. 3C, and FIG. 3D.

Figure 3A:
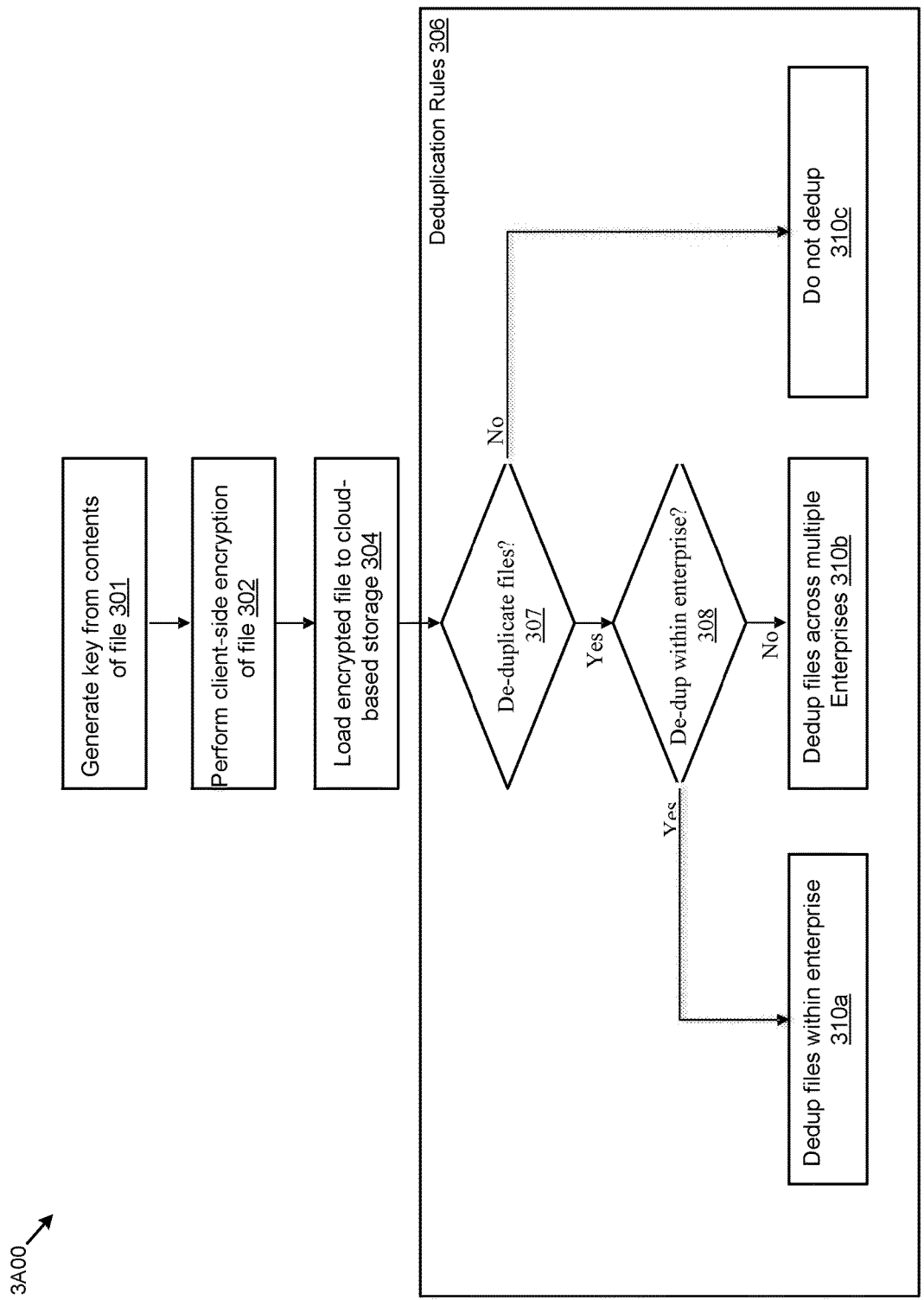
FIG. 3A is a flowchart of an approach to implement encryption, according to an embodiment.

FIG. 3A is a flowchart 3A00 of an approach to implement encryption. Convergent encryption techniques are applied to generate an encryption key from the contents of the file itself (see step 301). This type of key provides the ability to encrypt the file in a way that permits the file to be encrypted the same way by any client in the network. The encryption key can be generated by taking a hash of the contents of the file. Once the file is encrypted in this way, only someone with the same encryption key (e.g., someone who has access to the original file) can decrypt the file from its encrypted state. The file is, therefore, encrypted using the encryption key (see step 302) and the encrypted file is uploaded for storage in a cloud-based storage system (see step 304).

This cloud-based storage system may be implemented as a SaaS model, which means that multiple entities may be using this service to store its contents. In conventional systems, the fact that client-side encryption has occurred would preclude the ability to perform deduplication on the data to be stored in the cloud-based system. This is because each client would likely use its own encryption key to encrypt the file, and hence the encrypted versions of the same file would appear to be different to the storage system.

Within the present embodiment of the invention, the same content-based encryption key is used by each client to encrypt the file based on its content. As a result, the same file, even encrypted, would be identifiable by the storage as being the same. As such, at 306, deduplication (e.g., with selectable options) can be performed for the file (see deduplication rules 306), even though it has been encrypted by different parties. At first, this seems insecure (e.g., since only one key is being shared), however, it is important to note that the encryption key is made secure because it is only available to those that had access to the original content (i.e., the seed is the file itself). So implicitly, by the nature of how the content-based encryption key is generated, it provides security within the group of those that had access to the original content, even though the same encryption key is used.

Consider the situation of a client at a first Enterprise A that has encrypted a certain file (File 1). Further consider a client at a second Enterprise B that has also encrypted that same file. Both enterprises have uploaded that encrypted file to the cloud-based storage system. Since the file was encrypted with the same key by both, the storage system is able to perform deduplication such that only a single copy of that encrypted file needs to be stored in the storage system.

In some circumstances, it may not be appropriate to deduplicate files across different client entities. For example, there may be governmental prohibitions against this type of deduplication and/or corporate policies against such actions (e.g., due to sensitivity of the data, such as for medical records, etc.).

The portion of FIG. 3A at deduplication rules 306 depicts an approach to address this aspect according some embodiments of the invention. As before, convergent encryption techniques are applied to generate an encryption key from the contents of the file itself (see step 301) and the file is encrypted using the encryption key (see step 302). In addition, the file may be encrypted with one or more private keys held by the client and/or users at the client. The encrypted file is then uploaded for storage in a cloud-based storage system (see step 304).

A determination is made (see decision 307) as to whether the files should be deduplicated. If so, then another determination is made (see decision 308) as to whether the file should be deduplication only within the organization/enterprise (hereinafter referred to as "enterprise"), or whether deduplication can occur across multiple enterprises. This may be based upon, for example, policies set by the enterprise or policies set on an organizational basis, or policies set on a folder/directory basis or on a specific file basis, and/or on the basis of specific types of content.

If deduplication is permitted only within the organization, then the deduplication is performed only between the different users for that enterprise (see step 310*a*). As before, a content-based encryption key may be used, although it may include an additional encryption using a key specific to that organization.

If deduplication is permitted between multiple enterprises, then deduplication is performed by the cloud-based storage system (see step 310*a*). As before, the same key is used by each client to encrypt the file. As a result, the same file, even encrypted, would be identifiable by the storage system as being the same. As such, deduplication can be performed for the file, even though it has been encrypted by different parties.

If no deduplication is desired, the file is stored without deduplication (see step 310*c*).

Figure 3B:
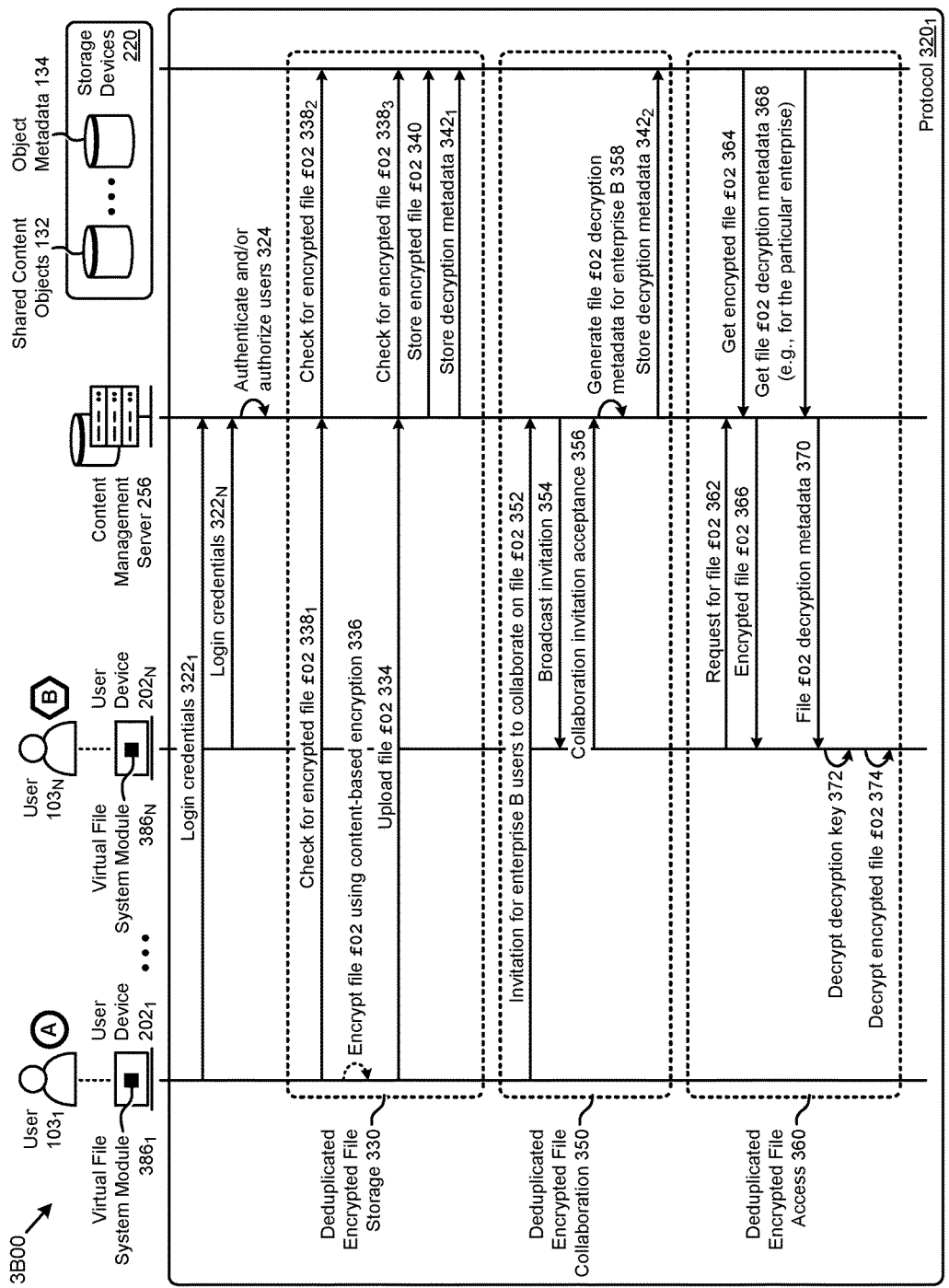
FIG. 3B depicts an environment in which interconnected computing components carry out a protocol for performing multiple key encryption for deduplication of shared content in a highly collaborative cloud-based environment, according to an embodiment.

FIG. 3B depicts an environment 3B00 in which interconnected computing components carry out a protocol for performing multiple key encryption for deduplication of shared content in a highly collaborative cloud-based environment. As an option, one or more variations of environment 3B00 or any aspect thereof may be implemented in the context of the architecture and functionality of the embodiments described herein.

As shown in FIG. 3B, the environment 3B00 comprises various computing systems (e.g., servers and devices) from local enterprise environment 110 and cloud-based storage environment 130 earlier described in FIG. 2A and FIG. 2B. The shown devices can communicate information (e.g., data, files, objects, messages, requests, data downloads, data uploads, etc.) over a network comprising any combination of a wide area network (e.g., WAN), local area network (e.g., LAN), cellular network, wireless LAN (e.g., WLAN), the Internet, and/or any such capability for facilitating communication in computing systems. As shown, the computing systems in the environment 3B00 can comprise at least one instance of the content management server 256 and at least one instance of storage devices 220. The servers and storage devices shown in environment 3B00 can represent any single computing system with dedicated hardware and software, multiple computing systems clustered together (e.g., a server farm, a host farm, etc.), a portion of shared resources on one or more computing systems (e.g., a virtual server), or any combination thereof. For example, the content management server 256 and storage devices 220 can comprise a cloud-based content management platform that provides shared content management and storage services.

The environment 3B00 can further comprise instances of user devices (e.g., user device 202$_1$, . . . , user device 202$_N$) that can represent one of a variety of other computing devices (e.g., a smart phone, a tablet, a WiFi phone, a laptop, a workstation, etc.) having software (e.g., operating system, applications, etc.) and hardware (e.g., a graphics processing unit, display, monitor, etc.) capable of processing and displaying information (e.g., web page, graphical user interface, etc.) on a display. As shown, user device $202_1$ can be operated by user $103_1$, and user device $202_N$ can be operated by user $103_N$. In certain embodiments, the herein disclosed techniques can be facilitated at least in part by an instance of a virtual file system module $386_1$ operating on user device $202_1$, and an instance of virtual file system $386_N$ operating on user device $202_N$. The storage devices 220 can comprise shared content objects 132 and object metadata 134, which in turn facilitates one or more of the herein disclosed techniques.

As shown, user device $202_1$, user device $202_N$, content management server 256, and storage devices 220 can carry out a set of high order interactions (e.g., operations, messages, etc.) in a protocol $320_1$. Specifically, and as shown, login credentials from the users operating the user devices can be received at the content management server 256 (see message $322_1$ and message $322_N$). The users can be respectively authenticated and/or authorized at the content management server 256 (see operation 324). For example, user $103_1$ might be authenticated as a user (e.g., employee) of enterprise A and authorized to access certain files owned by and/or shared with enterprise A. Further, user $103_N$ might be authenticated as a user (e.g., employee) of enterprise B and authorized to access certain files owned by and/or shared with enterprise B. More specifically, user $103_1$ might be authorized to access a file f02.

In one grouping of interactions depicting a deduplicated encrypted file storage aspect of the herein disclosed techniques (see grouping 330), user $103_1$ might want to manage the file f02 at user device $202_1$. For example, user $103_1$ might create, view, edit, and/or perform other operations on file f02. When user $103_1$ saves and/or closes file f02, then file f02 can be encrypted using content-based encryption by the user device and received at the content management server 256 (see message 334). In some cases, File f02 can be checked to see if it is already in existence. Such a check might be performed locally based on responses from checks for an encrypted file (see message $338_1$ and message $338_2$). If the file File f02 does not already exist, then it can be encrypted using content-based encryption according to the herein disclosed techniques (see operation 336) and then uploaded (as shown). There may be some cases when operation 336 is performed even though the file File f02 does already exist at storage devices 220.

To facilitate deduplication of the encrypted shared content, storage devices 220 can be checked for a pre-existing instance of encrypted file f02 (see message $338_3$) and if already pre-existing, then addition storage is unnecessary and deduplication is thusly accomplished. For example, in some embodiments, a fast check of object metadata 134 can be performed to determine a deduplication directive. If the deduplication directive indicates the encrypted file exists, then the encrypted file will not be stored. If the deduplication directive indicates the encrypted file is not stored at storage devices 220, encrypted file f02 can be stored (see message 340). A set of decryption metadata associated with user $103_1$ and/or the enterprise (e.g., enterprise A) associated with user $103_1$ can be stored in object metadata 134 (see message $342_1$). Such decryption metadata can be retrieved at a later time to facilitate decryption of encrypted file f02 by an authorized collaborator.

Deduplication can be performed based on an intra-enterprise deduplicate directive (where multiple entities from the same enterprise share a single common shared object), and/or deduplication can be performed based on an inter-enterprise deduplicate directive (where multiple entities from different enterprises share a single common shared object). Such collaboration can be implemented using the herein disclosed techniques as shown in a group of interactions depicting a deduplicated encrypted file collaboration operation (see grouping 350). Specifically, user $103_1$ might issue an invitation to enterprise B users to collaborate on file f02 (see message 352). The content management server 256 can broadcast the invitation to the user of enterprise B, which includes user $103_N$ at user device $202_N$ (see message 354). The content management server 256 can receive the collaboration invitation acceptance from user $103_N$ (see message 356). Responsive to receiving the acceptance, file f02 decryption metadata pertaining to enterprise B and/or user $103_N$ can be generated according to the herein disclosed techniques (see operation 358). The generated decryption metadata can be stored in object metadata 134 (see message $342_2$). Such decryption metadata can be retrieved at a later time to facilitate decryption of encrypted file f02.

Specifically, in a grouping of interactions depicting a deduplicated encrypted file access aspect of the herein disclosed techniques (see grouping 360), user $103_N$ might issue a request for access to file f02 that can be received by content management server 256 (see message 362). In response, content management server 256 can get encrypted file f02 from shared content objects 132 in storage devices 220 (see message 364) for delivery to user device 202N (see message 366). Content management server 256 can further get the file f02 decryption metadata associated with the requesting user (e.g., user $103_N$) and/or the enterprise (e.g., enterprise B) of the requesting user (see message 368) for delivery to user devices 202 (see message 370). At user device $202_N$, according to certain embodiments, file f02 decryption metadata can be decrypted using certain enterprise-based information such as an enterprise key (see operation 372). The decrypted decryption key can be used to decrypt the encrypted file f02 (see operation 374) to provide access to file f02.

Figure 3C:
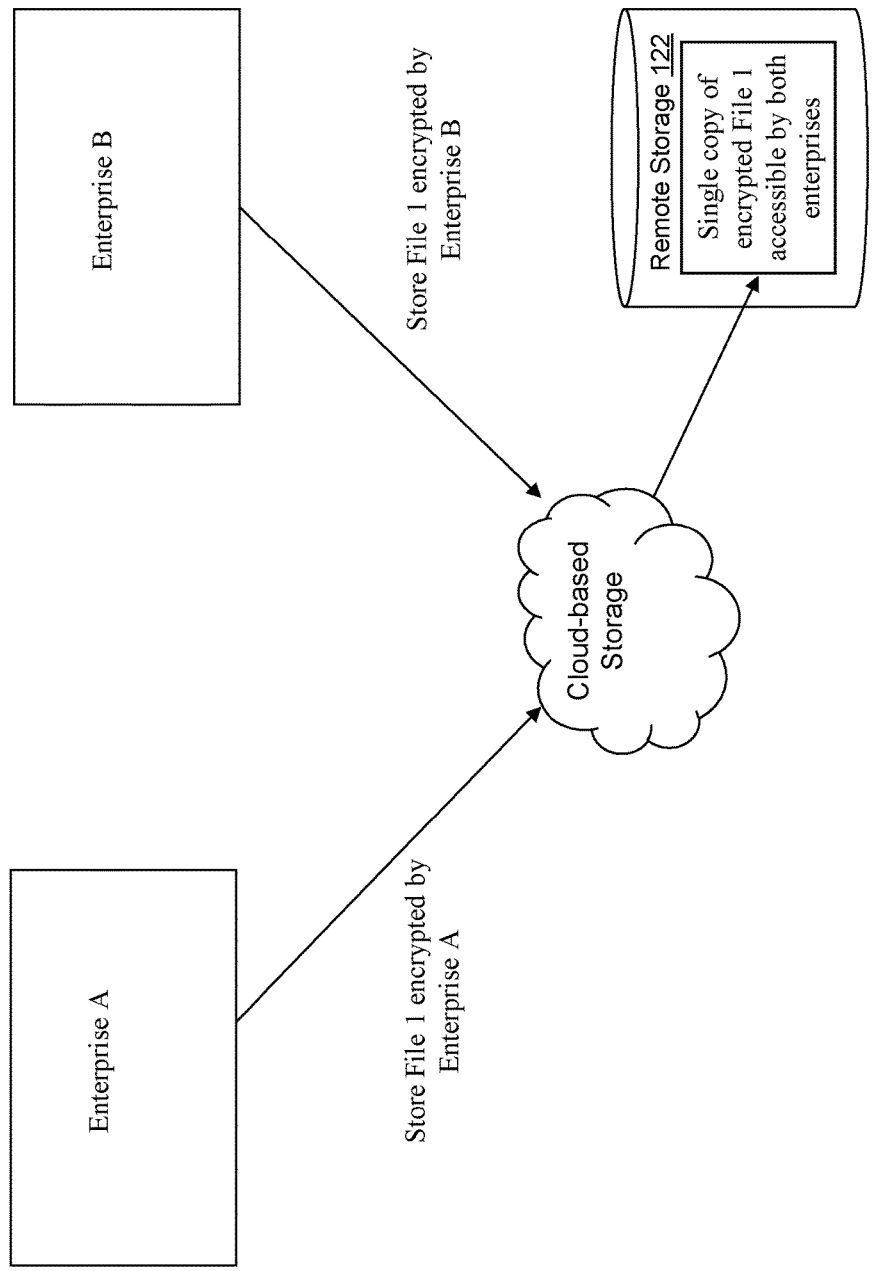
FIG. 3C and FIG. 3D illustrate encryption with deduplication, according to an embodiment.

FIG. 3C presents a chart 3C00 that graphically illustrates the situation where a client at a first Enterprise A has encrypted a certain file (File 1), and another client at a second Enterprise B has also encrypted that same file. Both enterprises have uploaded that encrypted file to the cloud-based storage system. Since the file was encrypted with the same key by both, the storage system is able to perform deduplication such that only a single copy of that encrypted file needs to be stored in the storage system.

Figure 3D:
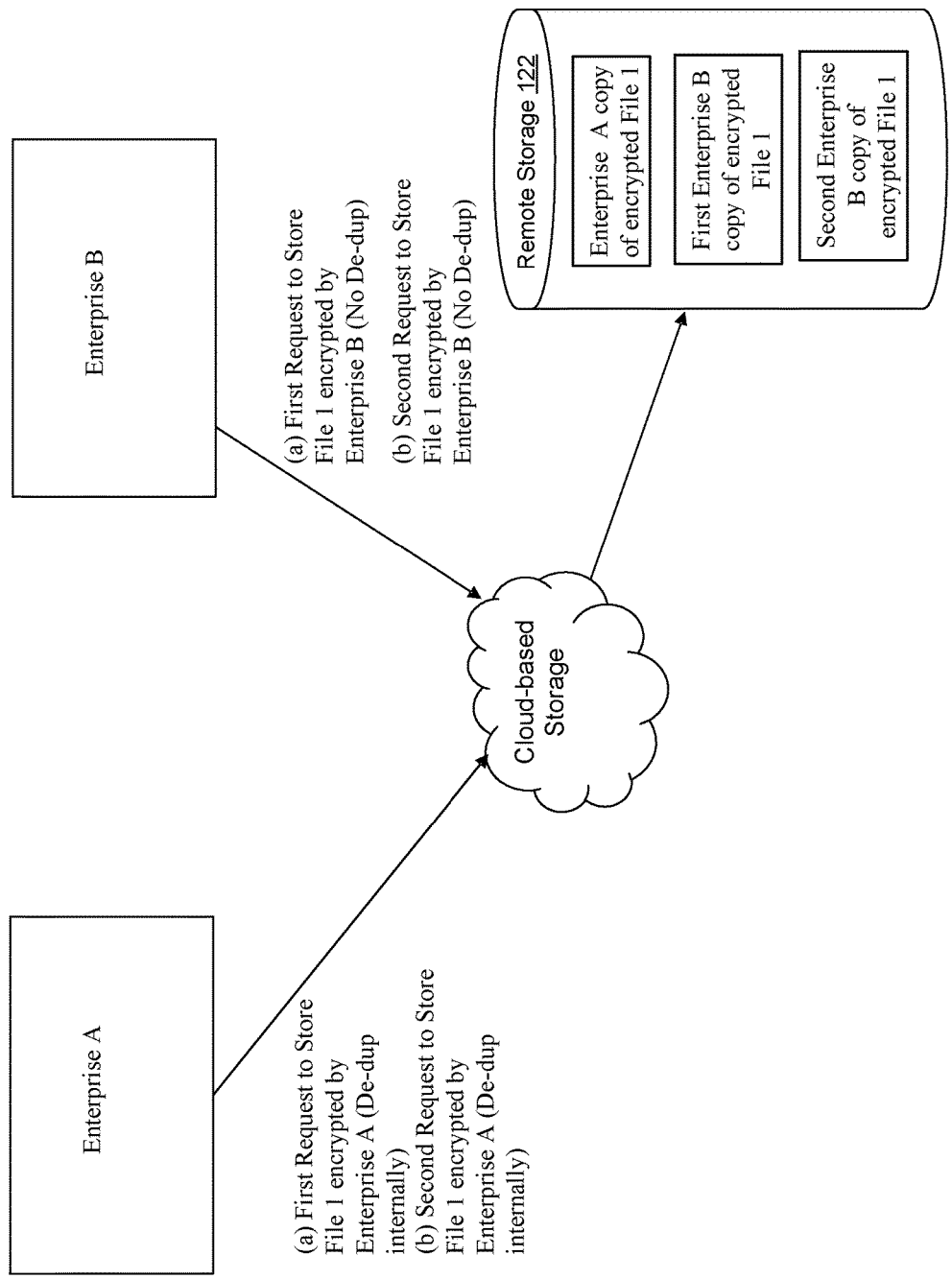

FIG. 3D presents a chart 3D00 that graphically illustrates situations where it may not be appropriate to deduplicate files across different client entities. For example, there may be governmental prohibitions against this type of deduplication and/or corporate policies against such actions (e.g., due to sensitivity of the data, such as for medical records, etc.).

As shown, multiple users at the first Enterprise A have encrypted a certain file (File 1), with deduplication enabled for deduplication internally (e.g., only within the organization). In addition, multiple users at the second Enterprise A have encrypted the same file (File 1), but with deduplication completely disabled. In this situation, the storage system observes the disable directive pertaining to deduplication for Enterprise B, and accordingly does not perform deduplication for Enterprise B. The storage system will include two copies of the file for Enterprise B. However, the storage system is directed to perform deduplication for the file for Enterprise A, and therefore only a single copy of that encrypted file needs to be stored in the storage system for Enterprise A. Since the deduplication for Enterprise A has been set for "internal only", this means that a separate deduped copy is stored for Enterprise A rather than sharing with any other enterprises.

Figure 4A:
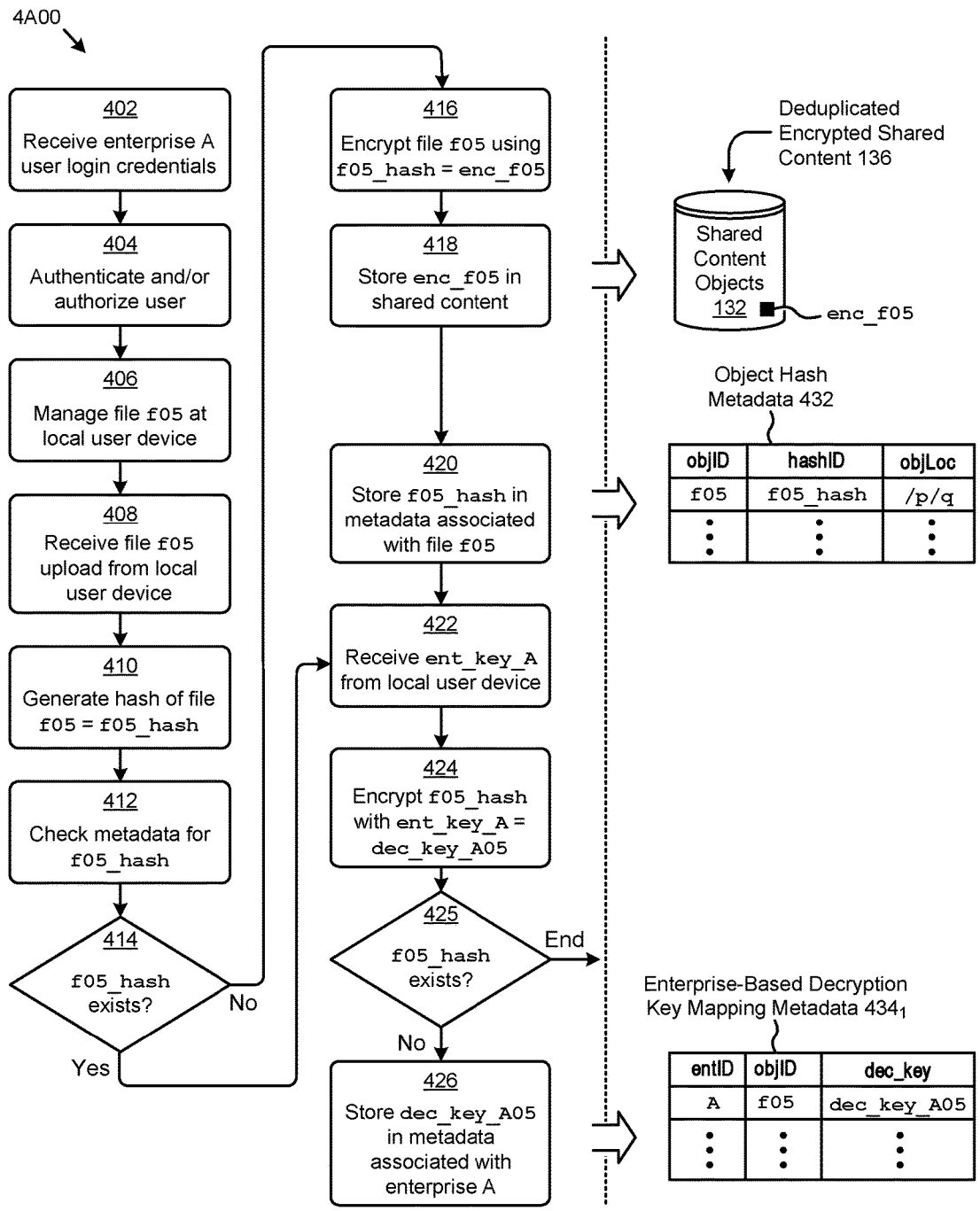
FIG. 4A presents a deduplicated encrypted file storage technique used in systems that implement multiple key encryption for deduplication of shared content in a highly collaborative cloud-based environment, according to an embodiment.
Figure 4B:
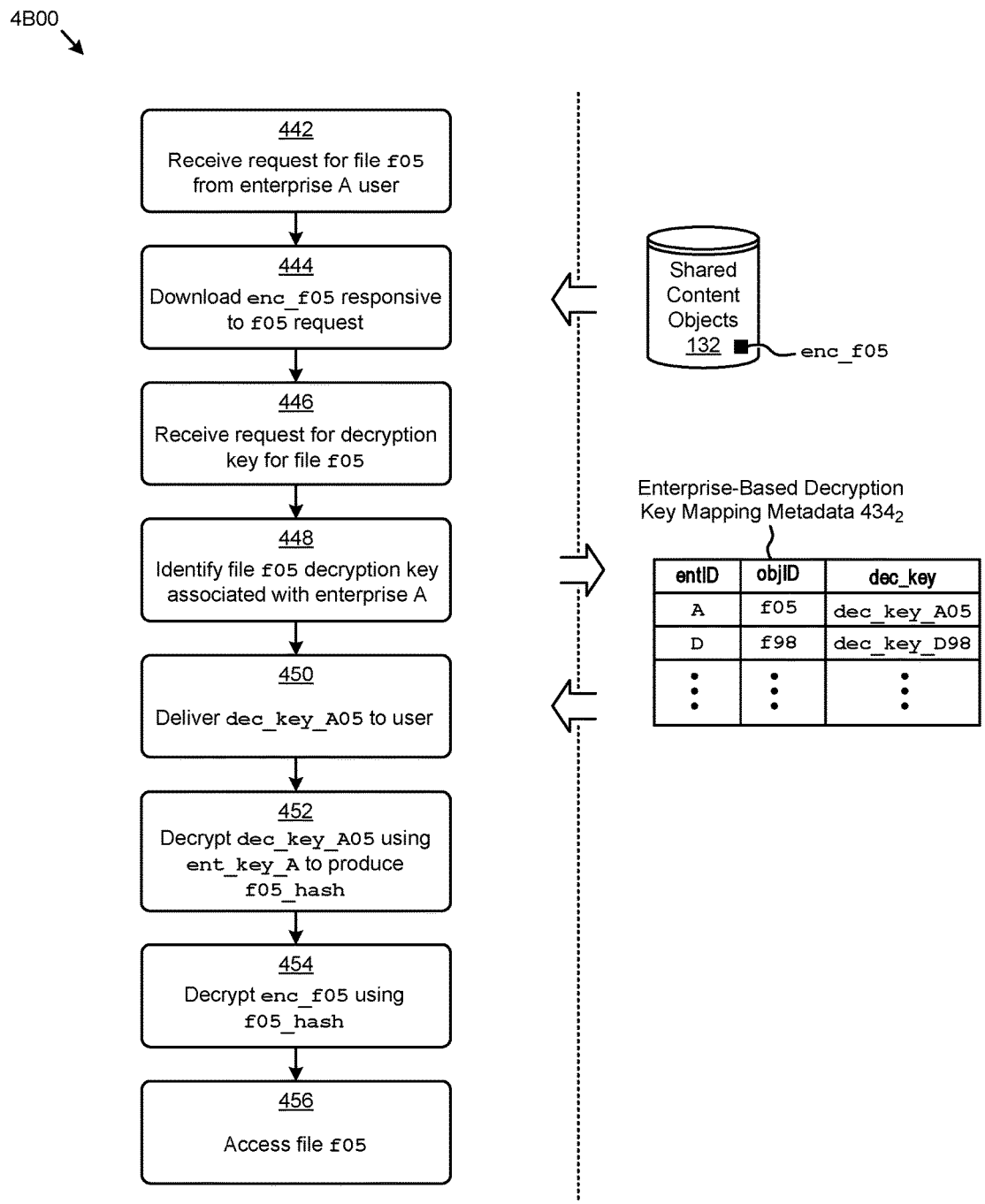
FIG. 4B presents a deduplicated encrypted file access technique used in systems that implement multiple key encryption for deduplication of shared content in a highly collaborative cloud-based environment, according to an embodiment.

Further details pertaining to implementation and use of various file storage and deduplication aspects of the herein disclosed techniques are presented as pertaining to FIG. 4A and FIG. 4B.

FIG. 4A presents a deduplicated encrypted file storage technique 4A00 used in systems that implement multiple key encryption for deduplication of shared content in a highly collaborative cloud-based environment. As an option, one or more variations of deduplicated encrypted file storage technique 4A00 or any aspect thereof may be implemented in the context of the architecture and functionality of the embodiments described herein. The deduplicated encrypted file storage technique 4A00 or any aspect thereof may be implemented in any environment.

The deduplicated encrypted file storage technique 4A00 presents one embodiment of certain steps and/or operations for storing deduplicated encrypted shared content in a highly collaborative cloud-based environment according to the herein disclosed techniques. In one or more embodiments, the steps and underlying operations shown in the deduplicated encrypted file storage technique 4A00 can be facilitated at least in part by an encryption engine in a virtual file system implemented in a local enterprise environment that interacts with a cloud-based environment such as is described in FIG. 2A. As shown, the deduplicated encrypted file storage technique 4A00 can commence with receiving the login credentials of a user from enterprise A (see step 402). For example, the user might log in to a cloud-based shared content service through a portal (e.g., single sign on interface) of enterprise A. The login credentials and/or other information (e.g., user device identifier, etc.) can be used to authenticate and/or authorize the user for certain operations (see step 404). For example, the user might be authorized to access certain shared content objects owned by and/or shared with enterprise A. Specifically, for example, the user might request access to a file f05 to manage at a local user device (see step 406). When management activities pertaining to file f05 are completed (e.g., user clicks "Save" after editing), file f05 can be uploaded to the cloud-based shared content service (see step 408).

The received file f05 can be used to generate a hash of file f05 that can be identified, for example, as f05_hash (see step 410). The hash can be generated on any computing platform such as is found in the local enterprise environment client (e.g., on a user device) or in the cloud-based storage environment (e.g., in a content management server). In some cases, the f05_hash can be used to determine if an encrypted copy of file f05 exists in the cloud-based shared content storage for certain deduplication operations. For example, object metadata (e.g., object hash metadata) associated with shared content objects 132 can store the hash of encrypted files stored in shared content objects 132. Such object metadata can be checked for a record pertaining to the f05_hash (see step 412). If the f05_hash does not exist in the metadata (see "No" path of decision 414), file f05 can be encrypted using f05_hash to produce a content-based encrypted file that can be identified, for example, as enc_f05 (see step 416). The content-based encrypted file enc_f05 can be stored in shared content objects 132 as shown (see step 418). The f05_hash can also be stored in a set of object hash metadata 432 (see step 420). For example, as shown, the object hash metadata 432 might associate the hash identifier or hashID (e.g., f05_hash) with an object identifier or objID (e.g., f05), an object location or objLoc (e.g., /p/q), and/or other object attributes. The foregoing approach facilitated by the herein disclosed techniques can result in deduplicated encrypted shared content 136 that is to be stored as shared content objects 132. Specifically, for example, checks of object hash metadata 432 (see step 412) at a later time can indicate that f05_hash exists in the metadata (see "Yes" path of decision 414) such that the operations of encrypting and storing file f05 are not performed.

The deduplicated encrypted file storage technique 4A00 can also receive a key associated with enterprise A and/or the user of enterprise A that can be identified, for example, as ent_key_A (see step 422). The ent_key_A can be used to encrypt f05_hash to produce a decryption key that can be identified, for example, as dec_key_A05 (see step 424). If necessary (see decision 425), the dec_key_A05 can be stored in metadata associated with enterprise A (see step 426). For example, the dec_key_A05 might be stored in a set of enterprise-based decryption key mapping metadata $434_1$ that associates the decryption key or dec_key (e.g., dec_key_A05) with an enterprise identifier or entID (e.g., entID=A for enterprise A). Exemplary embodiments, as shown, further include object IDs that are stored in metadata. This mapping to an object ID (e.g., objID) can be used to determine which file or object the dec_key correlates to.

The enterprise-based decryption key mapping metadata $434_1$ can be used to facilitate secure decryption of objects. One example is shown and described as pertaining to FIG. 4B.

FIG. 4B presents a deduplicated encrypted file access technique 4B00 used in systems that implement multiple key encryption for deduplication of shared content in a highly collaborative cloud-based environment. As an option, one or more variations of deduplicated encrypted file access technique 4B00 or any aspect thereof may be implemented in the context of the architecture and functionality of the embodiments described herein. The deduplicated encrypted file access technique 4B00 or any aspect thereof may be implemented in any environment.

The deduplicated encrypted file access technique 4B00 presents one embodiment of certain steps and/or operations for accessing and/or decrypting deduplicated encrypted shared content in a highly collaborative cloud-based environment according to the herein disclosed techniques. In one or more embodiments, the steps and underlying operations shown in the deduplicated encrypted file access technique 4B00 can be facilitated at least in part by an encryption engine in a virtual file system implemented in a local enterprise environment to interact with a cloud-based environment such as is described in FIG. 2A. As shown, the deduplicated encrypted file access technique 4B00 can commence with receiving a request for file f05 from a user from enterprise A (see step 442). For example, the requesting user might be authorized to access file f05. The encrypted instance of file f05, identified herein as enc_f05, can be downloaded (e.g., from shared content objects 132) to the user device of the requesting user (see step 444). Concurrent with and/or separate from the file f05 request, an associated request for a file f05 decryption key can be received (see step 446). Responsive to the file request and/or the decryption key request, the decryption key associated with file f05 and enterprise A can be identified (see step 448). For example, enterprise-based decryption key mapping metadata $434_2$ can be used to identify the dec_key=dec_key_A05 associated with enterprise A (e.g., entID=A) and object f05. In a multiple enterprise scenario, the enterprise-based decryption key mapping metadata $434_2$ might also comprise a dec_key=dec_key_D98 associated with enterprise D (e.g., entID=D), and object f98.

The deduplicated encrypted file access technique 4B00 can deliver decryption key dec_key_A05 to the user (see step 450). For example, decryption key dec_key_A05 can be delivered to the local user device of the user to be decrypted using the ent_key_A of the user to produce the f05_hash (see step 452). The f05_hash can be used to decrypt encrypted file enc_f05 earlier received (see step 454). Decrypting enc_f05 can produce file f05 for access by the user (see step 456).

In some cases, one or more users from enterprise A might want to collaborate on file f05 with users from other enterprises (e.g., enterprise B). Such a collaboration scenario as implemented by the herein disclosed techniques is described as pertaining to FIG. 4C.

Figure 4C:
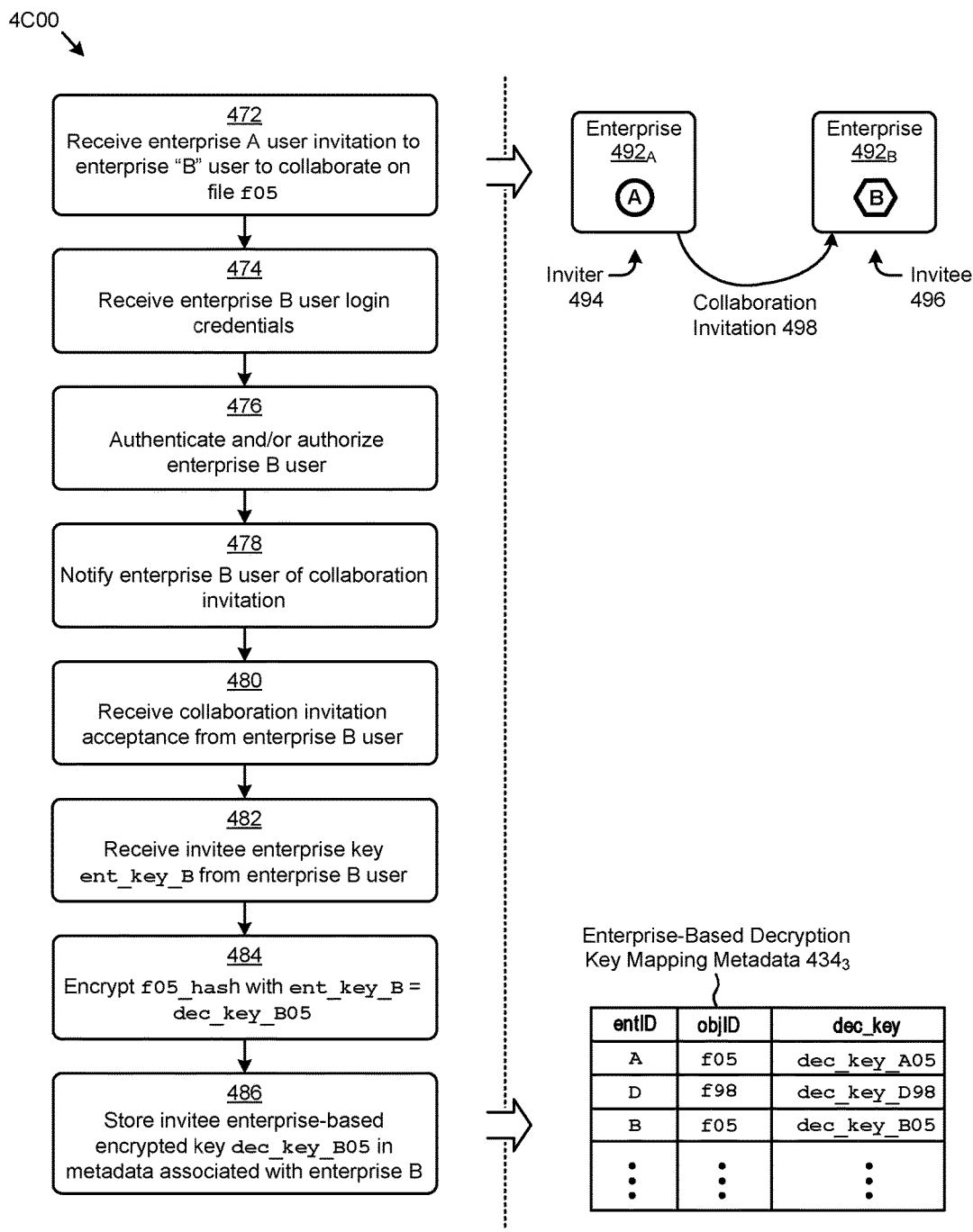
FIG. 4C presents a deduplicated encrypted file collaboration technique used in systems that implement multiple key encryption for deduplication of shared content in a highly collaborative cloud-based environment, according to an embodiment.

FIG. 4C presents a deduplicated encrypted file collaboration technique 4C00 used in systems that implement multiple key encryption for deduplication of shared content in a highly collaborative cloud-based environment. As an option, one or more variations of deduplicated encrypted file collaboration technique 4C00 or any aspect thereof may be implemented in the context of the architecture and functionality of the embodiments described herein. The deduplicated encrypted file collaboration technique 4C00 or any aspect thereof may be implemented in any environment.

The deduplicated encrypted file collaboration technique 4C00 presents one embodiment of certain steps and/or operations for collaborating on deduplicated encrypted shared content in a highly collaborative cloud-based environment according to the herein disclosed techniques. In one or more embodiments, the steps and underlying operations shown in the deduplicated encrypted file collaboration technique 4C00 can be facilitated at least in part by an encryption engine in a virtual file system implemented in a local enterprise environment to interact with a cloud-based environment such as is described in FIG. 2A. As shown, the deduplicated encrypted file collaboration technique 4C00 might apply to a scenario pertaining to one or more users of an enterprise $492_A$ (e.g., enterprise A) issuing a collaboration invitation 498 to one or more users of an enterprise $492_B$ (e.g., enterprise B) to collaborate on one or more shared content objects. Specifically, the deduplicated encrypted file collaboration technique 4C00 can commence with receiving an invitation from an enterprise A user (e.g., inviter 494) to an enterprise B user (e.g., invitee 496) to collaborate on file f05 earlier described (see step 472). Responsive to receiving the enterprise B user login credentials (see step 474) and/or authenticating and/or authorizing the enterprise B user (see step 476), the enterprise B user can be notified of the collaboration invitation (see step 478).

Concurrent with or separately from receiving a collaboration invitation acceptance from the enterprise B user (see step 480), the invitee enterprise key (e.g., ent_key_B) associated with the enterprise B and/or the enterprise B user can be received (see step 482). The hash of the requested file f05, or f05_hash, can be encrypted with enterprise key ent_key_B to produce an invitee enterprise-based encrypted key (e.g., for decryption) that can be identified, for example, as dec_key_B05 (see step 484). The dec_key_B05 can be stored in metadata associated with enterprise B (see step 486). For example, dec_key_B05 might be stored in a set of enterprise-based decryption key mapping metadata $434_3$ that associates the decryption key or dec_key (e.g., dec_key_B05) with an enterprise identifier or entID (e.g., entID=B for enterprise B). The enterprise-based decryption key mapping metadata $434_3$ can, in part, facilitate secure decryption of file f05 by users of enterprise B authorized to access file f05.

As earlier mentioned, the foregoing techniques can facilitate storing a set of deduplicated encrypted shared content in a highly collaborative cloud-based environment. Further details characterizing such deduplication are described as pertaining to FIG. 5.

Figure 5:
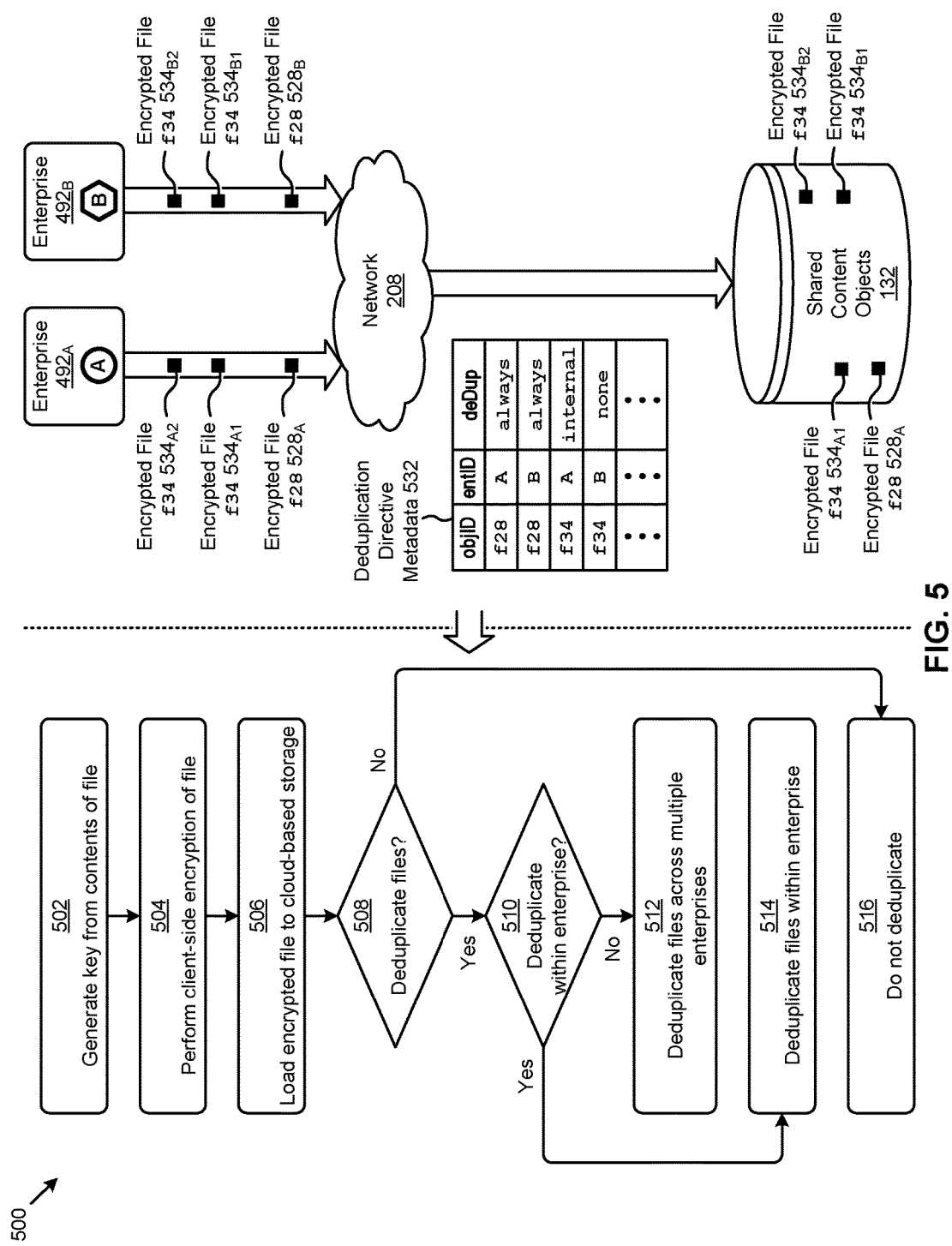
FIG. 5 illustrates an encrypted file deduplication technique used in systems that implement multiple key encryption for deduplication of shared content in a highly collaborative cloud-based environment, according to an embodiment.

FIG. 5 illustrates an encrypted file deduplication technique 500 used in systems that implement multiple key encryption for deduplication of shared content in a highly collaborative cloud-based environment. As an option, one or more variations of encrypted file deduplication technique 500 or any aspect thereof may be implemented in the context of the architecture and functionality of the embodiments described herein. The encrypted file deduplication technique 500 or any aspect thereof may be implemented in any environment.

The encrypted file deduplication technique 500 presents one embodiment of certain steps and/or operations for encrypting and/or deduplicating shared content in a highly collaborative cloud-based environment according to the herein disclosed techniques. In one or more embodiments, the steps and underlying operations shown in the encrypted file deduplication technique 500 can be facilitated at least in part by an encryption engine in a virtual file system implemented in a local enterprise environment to interact with a cloud-based environment such as described in FIG. 2A. In some embodiments, certain operations pertaining to the encryption and/or deduplication techniques described herein can be performed in the local environment or the cloud-based environment.

As shown, the encrypted file deduplication technique 500 might apply to a scenario pertaining to one or more users of an enterprise $492_A$ (e.g., enterprise A) and one or more uses of an enterprise $492_B$ (e.g., enterprise B) collaborating on various files (e.g., file f28 and file f34). Specifically, the encrypted file deduplication technique 500 can commence with generating an encryption key from the contents of a subject file (see step 502). For example, a hash of file f28 and a hash of file f34 might be generated to serve as encryption keys. The encryption keys can then be used to encrypt the respective files (see step 504). Such content-based encryption can facilitate a consistent file encryption scheme among multiple collaborators and/or user devices. Further, as described herein, access to the content-based encrypted files can be secure by using an enterprise-based decryption key (e.g., available to users provisioned access to the underlying file). The content-based encrypted file can then be uploaded to the cloud-based storage system (see step 506). As shown in FIG. 5, a user from enterprise A and a user from enterprise B might upload (e.g., over network 208) an instance of encrypted file f28 (e.g., encrypted file f28 $528_A$ and encrypted file f28 $528_B$, respectively). Further, multiple users from enterprise A might upload multiple instances of encrypted file f34 (e.g., encrypted file f34 $534_{A1}$ and encrypted file f34 $534_{A2}$), while multiple users from enterprise B also upload multiple instances of encrypted file f34 (e.g., encrypted file f34 $534_{B1}$ and encrypted file f34 $534_{B2}$).

As earlier described, certain local and/or client-side encryption approaches might preclude the ability to perform deduplication of the encrypted content stored in the cloud-based system. In such approaches, a client-based encryption key might be used to encrypt the underlying file resulting in multiple encrypted instances of the same underlying file in the storage system. The herein disclosed techniques address such deduplication challenges by implementing one content-based encryption key for a given file. In this case, encrypted instances of the file can be identified as being associated with the file to facilitate deduplication. Specifically, the encrypted file deduplication technique 500 can implement various deduplication operations based on file storage commands (e.g., deduplication directives). In some embodiments, the deduplication directives might be codified in a set of deduplication directive metadata 532 that associates a deduplication directive (e.g., deDup) with a given object (e.g., objID) and/or enterprise (e.g., entID).

For example, the deduplication directive metadata 532 might indicate that the encrypted instances of file f28 should "always" be deduplicated for enterprise A and enterprise B. The deduplication directive metadata 532 might also indicate that the encrypted instances of file f34 should be processed according to an "internal" deduplication directive for enterprise A, but not be deduplicated (e.g., as indicated by deDup=none) for enterprise B. For example, government and/or corporate policies (e.g., associated with medical records) might result in certain deduplication directives and/or constraints. Further, such deduplication directives can be based upon, for example, policies set by the enterprise on an organizational basis, on a folder and/or directory basis, on a specific file basis, and/or for specific types of content.

According to the encrypted file deduplication technique 500 facilitated by the herein disclosed techniques, the deduplication directives (e.g., from the deduplication directive metadata 532) can be analyzed to determine if deduplication is to be performed (see decision 508). If the deduplication directive indicates no deduplication (see "No" path of decision 508) then no deduplication will be performed (see step 516). For example, according to the deduplication directive metadata 532, the instances of encrypted file f34 uploaded from enterprise B will not be deduplicated, as represented by the encrypted file f34 $534_{B1}$ and the encrypted file f34 $534_{B2}$ shown in shared content objects 132. If the files are to be deduplicated (see "Yes" path of decision 508), then a determination can be made as to whether the deduplication is to occur internal to an enterprise or across multiple enterprises (see decision 510). If the deduplication directive precipitates deduplication within or internal to an enterprise (see "Yes" path of decision 510) then deduplication will be performed on encrypted files from within an enterprise (see step 514).

For example, according to deduplication directive metadata 532, the instances of encrypted file f34 uploaded from enterprise A will be deduplicated internal to enterprise A, as represented by the one instance of encrypted file f34 $534_{A1}$ shown in shared content objects 132. If the deduplication directive indicates that deduplication should occur across enterprises (see "No" path of decision 510) then deduplication will be performed on encrypted files uploaded across multiple enterprises (see step 512). For example, according to deduplication directive metadata 532, the instances of encrypted file f28 uploaded from enterprise A and enterprise B will be deduplicated across enterprises, as represented by the one instance of encrypted file f28 $528_A$ shown in shared content objects 132. In this case, for example, the encrypted file f28 $528_A$ might be received at an earlier moment in time than the moment in time the encrypted file f28 $528_B$ was received.

Figure 6A:
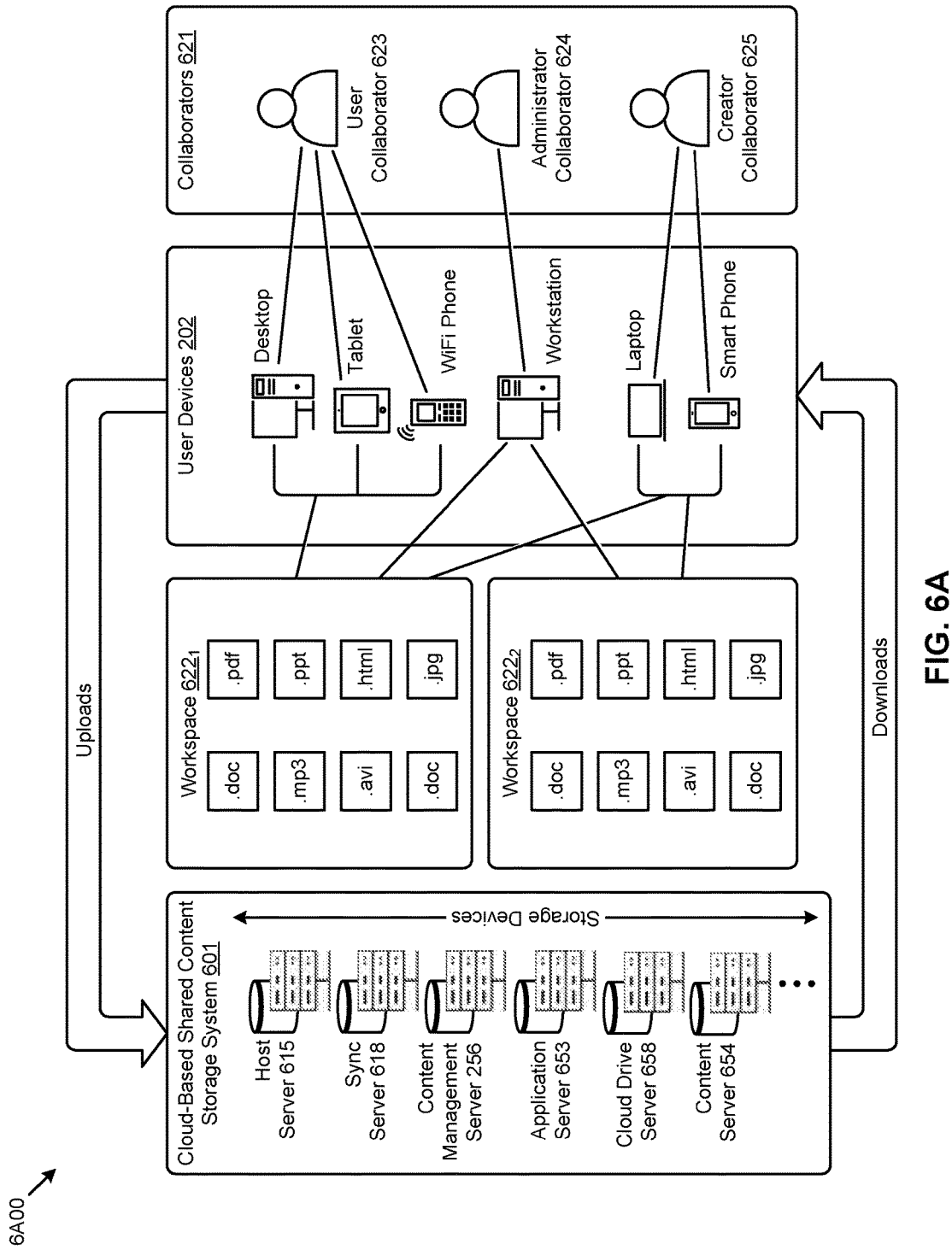
FIG. 6A depicts a block diagram of a cloud-based environment including a collaborative cloud-based shared content management platform that facilitates multiple key encryption for deduplication of shared content, according to some embodiments.

FIG. 6A depicts a block diagram 6A00 of a cloud-based environment including a collaborative cloud-based shared content management platform that facilitates multiple key encryption for deduplication of shared content. As an option, one or more variations of block diagram 6A00 or any aspect thereof may be implemented in the context of the architecture and functionality of the embodiments described herein. The block diagram 6A00 or any aspect thereof may be implemented in any environment.

As shown, certain users (e.g., collaborators 621) having various collaboration roles (e.g., user collaborator 623, administrator collaborator 624, creator collaborator 625, etc.) can use one or more instances of user devices 202 to interact with one or more workspaces (e.g., workspace $622_1$, workspace $622_2$, etc.) within the cloud-based environment. The workspaces can be stored in any location, and are at least partially maintained by components within a cloud-based shared content storage system 601. The cloud-based shared content storage system 601 supports any variety of processing elements and/or storage devices (e.g., a storage filer, a storage facility, etc.) and/or servers such as a host server 615, a sync server 618, a content management server 256, an application server 653, a cloud drive server 658, a content server 654, and/or other processing elements.

Any of the users can access shared content from the cloud-based shared content storage system 601 without the additional process of manually downloading and storing a file locally on an instance of user devices 202 such as a desktop computer, a tablet, a WiFi phone, a workstation, a laptop, a smart phone, and/or other user devices. For example, a content object (e.g., computer file, text document, audio file, video file, image file, etc.) created by the creator collaborator 625 might be viewed by user collaborator 623 without informing user collaborator 623 where the file is physically stored in the storage devices. Such a facility streamlines the frequently repeated sharing and collaboration processes.

Functions and techniques performed by the cloud-based shared content storage system 601 and/or the client side components (e.g., user devices 202, a collaboration client and/or application on an instance of user devices 202, etc.) are described herein with further details and with reference to several examples. Further details pertaining to implementing the herein disclosed techniques in the cloud-based environment are described in FIG. 6B.

Figure 6B:
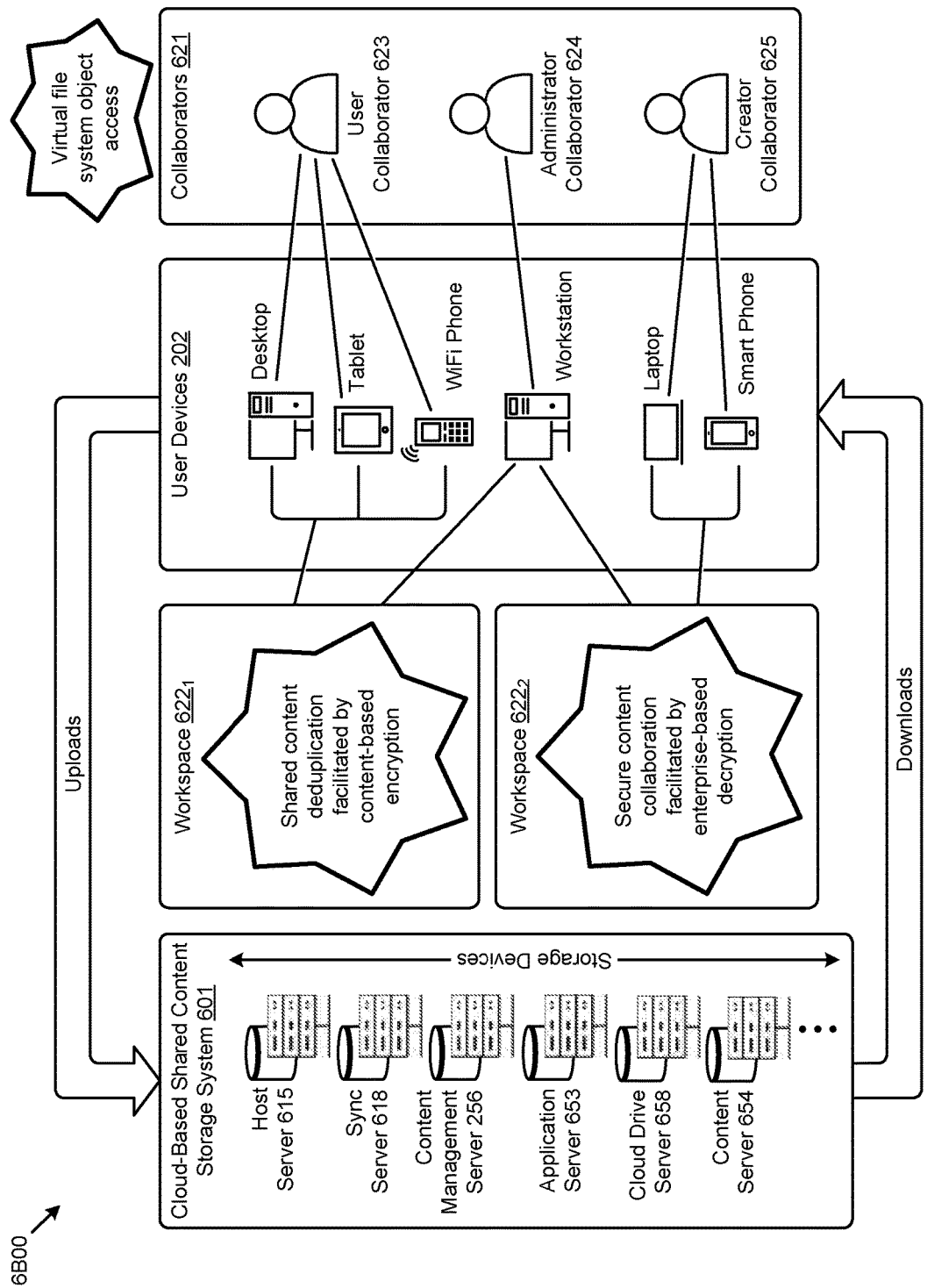
FIG. 6B presents a schematic of a cloud-based environment showing workspace activities pertaining to multiple key encryption for deduplication of shared content, according to some embodiments.

FIG. 6B presents a schematic 6B00 of a cloud-based environment showing workspace activities pertaining to multiple key encryption for deduplication of shared content. As an option, one or more variations of schematic 6B00 or any aspect thereof may be implemented in the context of the architecture and functionality of the embodiments described herein. The schematic 6B00 or any aspect thereof may be implemented in any environment.

The embodiment shown in FIG. 6B is merely one example of various activities and/or operations facilitated by the herein disclosed techniques for multiple key encryption for deduplication of shared content in a highly collaborative cloud-based environment. Specifically, according to some embodiments, the collaborators 621 (e.g., user collaborator 623, the administrator collaborator 624, and the creator collaborator 625) in the cloud-based environment might use an instance of a facility that provides techniques for multiple key encryption over shared content on one or more of the user devices 202 to access various shared content (e.g., objects, files, encrypted objects, encrypted files, metadata, etc.) stored in the storage devices of the cloud-based shared content storage system 601. As shown in workspace $622_1$, the herein disclosed techniques can facilitate shared content deduplication using content-based encryption. Further, as shown in workspace $622_2$, the herein disclosed techniques can also facilitate secure (e.g., encrypted) content collaboration using enterprise-based decryption.

Figure 7A:
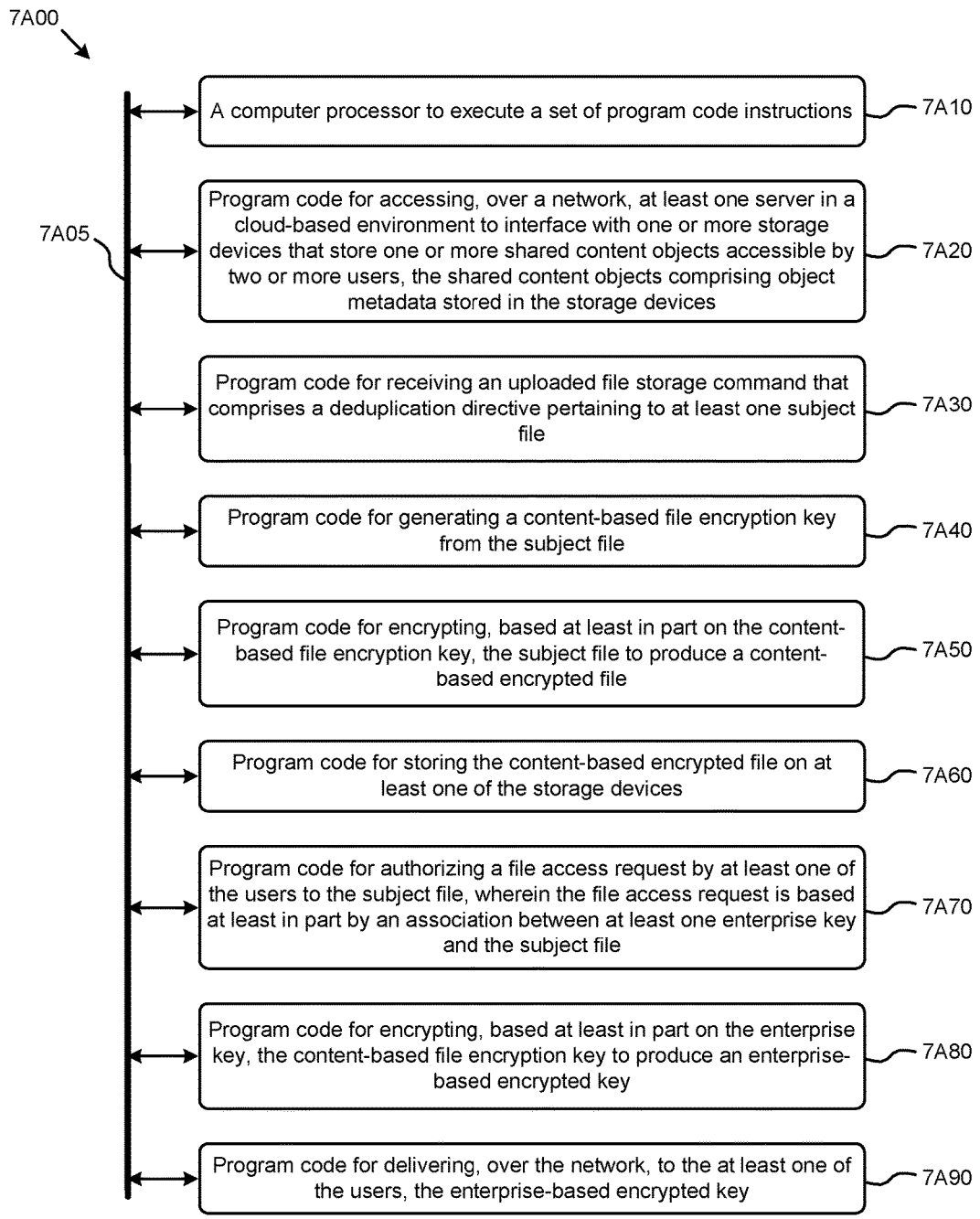
FIG. 7A, FIG. 7B, and FIG. 7C depict system components as arrangements of computing modules that are interconnected so as to implement certain of the herein-disclosed embodiments.

Additional Embodiments of the Disclosure
Additional Practical Application Examples FIG. 7A depicts a system 7A00 as an arrangement of computing modules that are interconnected so as to operate cooperatively to implement certain of the herein-disclosed embodiments. The partitioning of system 7A00 is merely illustrative and other partitions are possible. As an option, the system 7A00 may be implemented in the context of the architecture and functionality of the embodiments described herein. Of course, however, the system 7A00 or any operation therein may be carried out in any desired environment.

The system 7A00 comprises at least one processor and at least one memory, the memory serving to store program instructions corresponding to the operations of the system. As shown, an operation can be implemented in whole or in part using program instructions accessible by a module. The modules are connected to a communication path 7A05, and any operation can communicate with other operations over communication path 7A05. The modules of the system can, individually or in combination, perform method operations within system 7A00. Any operations performed within system 7A00 may be performed in any order unless as may be specified in the claims.

The shown embodiment implements a portion of a computer system, presented as system 7A00, comprising a computer processor to execute a set of program code instructions (see module 7A10) and modules for accessing memory to hold program code instructions to perform: accessing, over a network, at least one server in a cloud-based environment to interface with one or more storage devices that store one or more shared content objects accessible by two or more users, the shared content objects comprising object metadata stored in the storage devices (see module 7A20); receiving an uploaded file storage command that comprises a deduplication directive pertaining to at least one subject file (see module 7A30); generating a content-based file encryption key from the subject file (see module 7A40); encrypting, based at least in part on the content-based file encryption key, the subject file to produce a content-based encrypted file (see module 7A50); storing the content-based encrypted file on at least one of the storage devices (see module 7A60); authorizing a file access request by at least one of the users to the subject file, where the file access request is based at least in part by an association between at least one enterprise key and the subject file (see module 7A70); encrypting, based at least in part on the enterprise key, the content-based file encryption key to produce an enterprise-based encrypted key (see module 7A80); and delivering, over the network, to the at least one of the users, the enterprise-based encrypted key (see module 7A90).

Variations of the foregoing may include more or fewer of the shown modules and variations may perform more or fewer (or different) steps, and/or may use data elements in more, or in fewer or different operations.

Strictly as examples, some variations include:

Variations that further comprise delivering, over the network, a virtual file system module to one or more user devices associated with the users to access one or more of the shared content objects, the virtual file system module to perform at least one act of the method.

Variations that further comprise receiving the subject file from the at least one of the users.

Variations that further comprise determining at least one deduplication directive, and storing (e.g., based on the deduplication directive) the content-based encrypted file in the shared content objects of the storage devices.

Variations where the deduplication directive is based at least in part on one of, the shared content objects, the object metadata, the subject file, or the enterprise key.

Variations that further comprise storing at least one of, the enterprise key, or the content-based file encryption key, or the enterprise-based encrypted key, in the object metadata.

Variations that further comprise decrypting, based on the enterprise key, the enterprise-based encrypted key to produce the content-based file encryption key, and decrypting, based on the content-based file encryption key, the content-based encrypted file to produce the subject file.

Variations that further comprise receiving a file request to access the subject file from the at least one of the users, delivering the content-based encrypted file to the at least one of the users, and delivering the enterprise-based encrypted key to the at least one of the users.

Variations that further comprise receiving a collaboration invitation acceptance from at least one invitee from the users, then provisioning file access by the invitee to the subject file.

Variations where the file access is characterized by an association between an invitee enterprise key and the subject file.

Variations that further comprise encrypting, based on the invitee enterprise key and the content-based file encryption key, to produce an invitee enterprise-based encrypted key.

Variations that further comprise storing the invitee enterprise-based encrypted key in the object metadata.

Figure 7B:
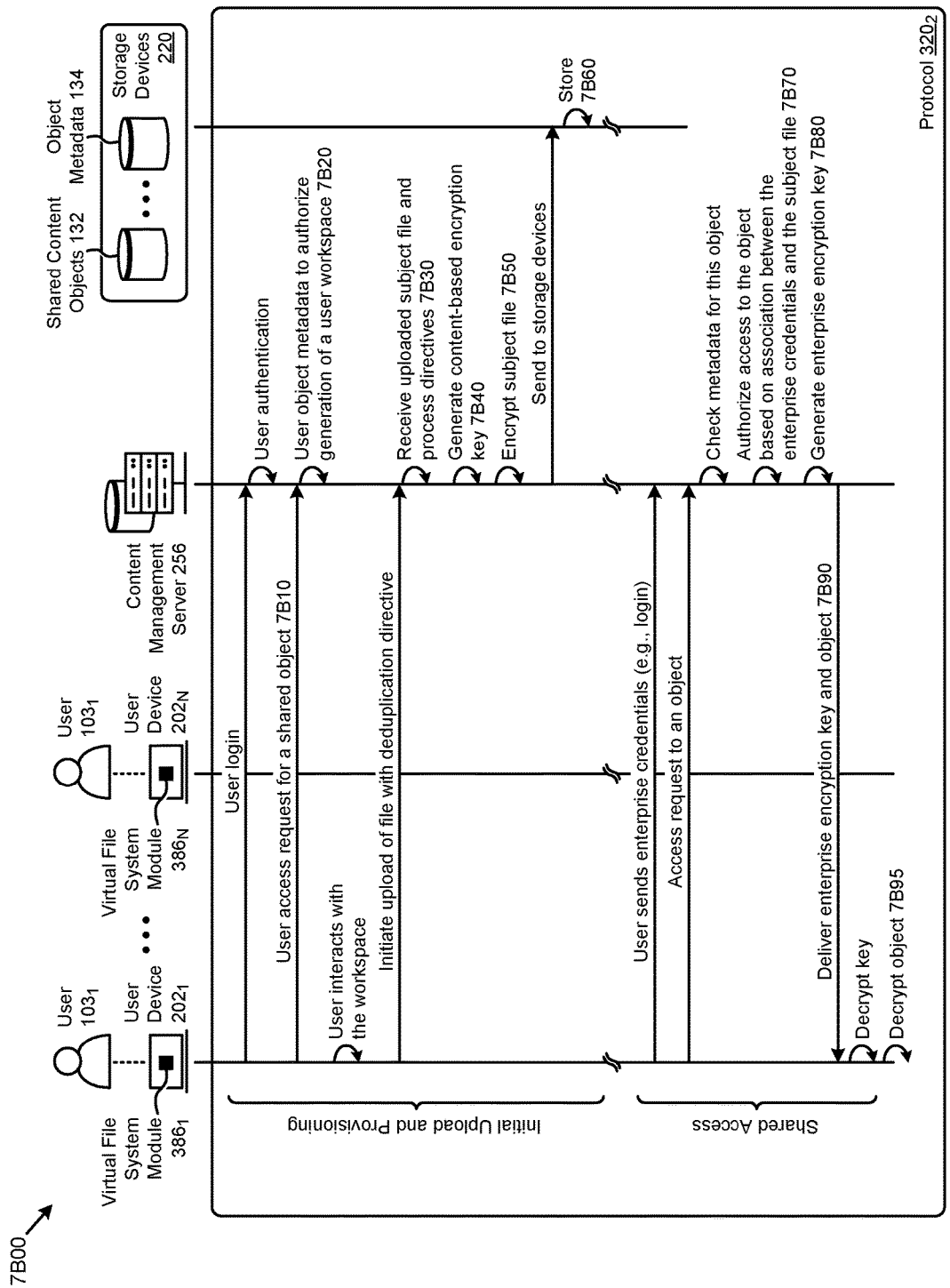

FIG. 7B depicts a system 7B00 within which a protocol $320_2$ can be carried out. As shown, user device $202_1$ can be operated by user $103_1$, and user device $202_N$ can be operated by user $103_N$. In certain embodiments, the herein disclosed techniques can be facilitated at least in part by an instance of a virtual file system module $386_1$ operating on user device $202_1$, and an instance of virtual file system $386_N$ operating on user device $202_N$. The storage devices 220 can comprise shared content objects 132 and object metadata 134, which in turn facilitates one or more of the herein disclosed techniques.

As shown, protocol $320_2$ commences when a user sends an access request to a server in a cloud-based environment (see message 7B10). The server hosts shared content objects comprising object metadata stored in the storage devices. The access request is authorized (see operation 7B20). The server further receives an uploaded file storage command (see message 7B30) that comprises a deduplication directive pertaining to at least one subject file. The server generates a content-based file encryption key from the subject file (see operation 7B40), and then encrypts the subject file using the content-based file encryption key (e.g., see operation 7B50) to form a content-based encrypted file. The server stores (or causes to be stored) the content-based encrypted file on one of the storage devices (see operation 7B60).

In a sharing scenario, the server can authorize other users (e.g., collaborators) to access the subject file. Authorization can be based on an association between an enterprise key of the user and the subject file (see operation 7B70). The server further encrypts the content-based file encryption key using the enterprise key so as to produce an enterprise-based encrypted key (see operation 7B80). Both the requested file (e.g., in its content-based encrypted file form) and the enterprise-based encrypted key is delivered (e.g., over the network) to the user (see operation 7B90). The user can then decrypt the requested file, first by decrypting the enterprise-based encrypted key to obtain the content-based file encryption key, and then to use the content-based file encryption key to decrypt the content-based encrypted file (see operation 7B95).

Figure 7C:
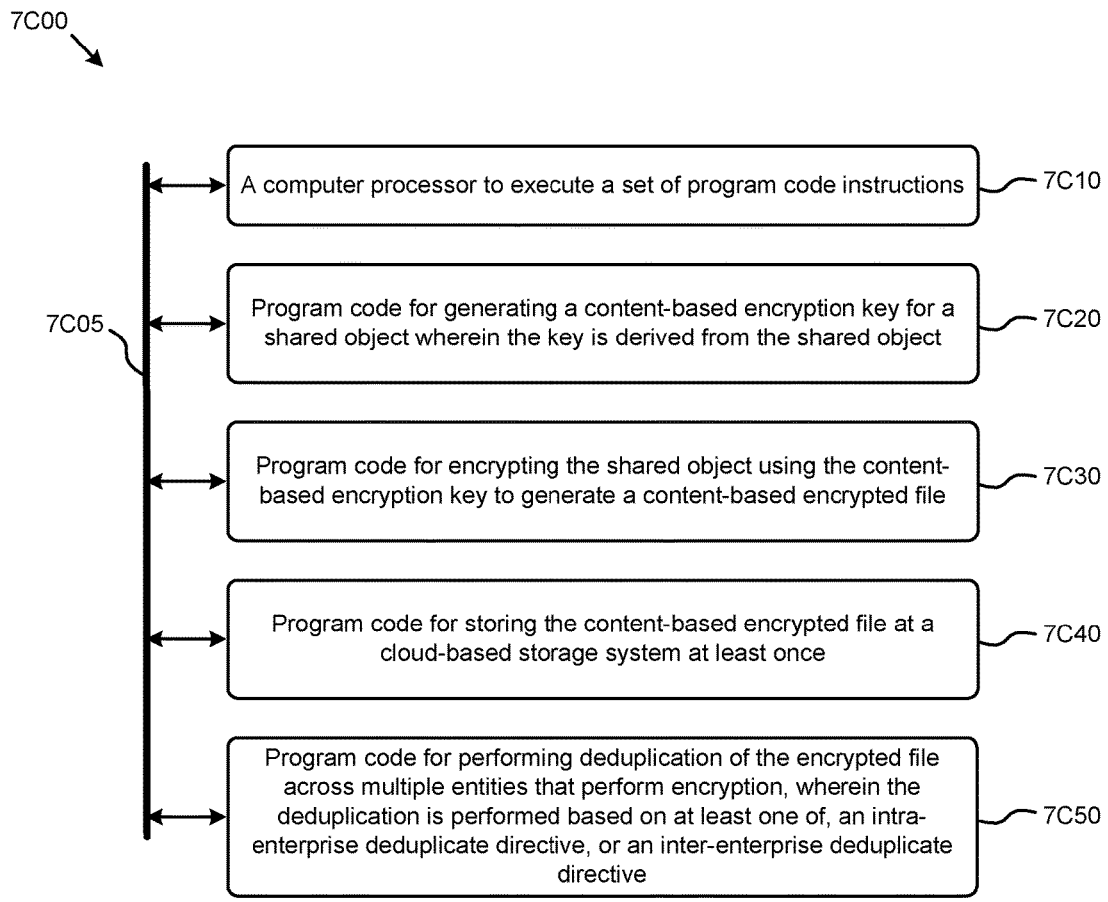

FIG. 7C depicts a system 7C00 as an arrangement of computing modules that are interconnected so as to operate cooperatively to implement certain of the herein-disclosed embodiments. The partitioning of system 7C00 is merely illustrative and other partitions are possible. As an option, the system 7C00 may be implemented in the context of the architecture and functionality of the embodiments described herein. Of course, however, the system 7C00 or any operation therein may be carried out in any desired environment.

The system 7C00 comprises at least one processor and at least one memory, the memory serving to store program instructions corresponding to the operations of the system. As shown, an operation can be implemented in whole or in part using program instructions accessible by a module. The modules are connected to a communication path 7C05, and any operation can communicate with other operations over communication path 7C05. The modules of the system can, individually or in combination, perform method operations within system 7C00. Any operations performed within system 7C00 may be performed in any order unless as may be specified in the claims.

The shown embodiment implements a portion of a computer system, presented as system 7C00, comprising a computer processor to execute a set of program code instructions (see module 7C10) and modules for accessing memory to hold program code instructions to perform: generating a content-based encryption key for a shared object wherein the key is derived from the shared object (see module 7C20); encrypting the shared object using the content-based encryption key to generate a content-based encrypted file (see module 7C30); storing the content-based encrypted file at a cloud-based storage system at least once (see module 7C40); and performing deduplication of the encrypted file across multiple entities that perform encryption, wherein the deduplication is performed based on at least one of, an intra-enterprise deduplicate directive, or an inter-enterprise deduplicate directive (see module 7C50).

System Architecture Overview
Additional System Architecture Examples

Figure 8A:
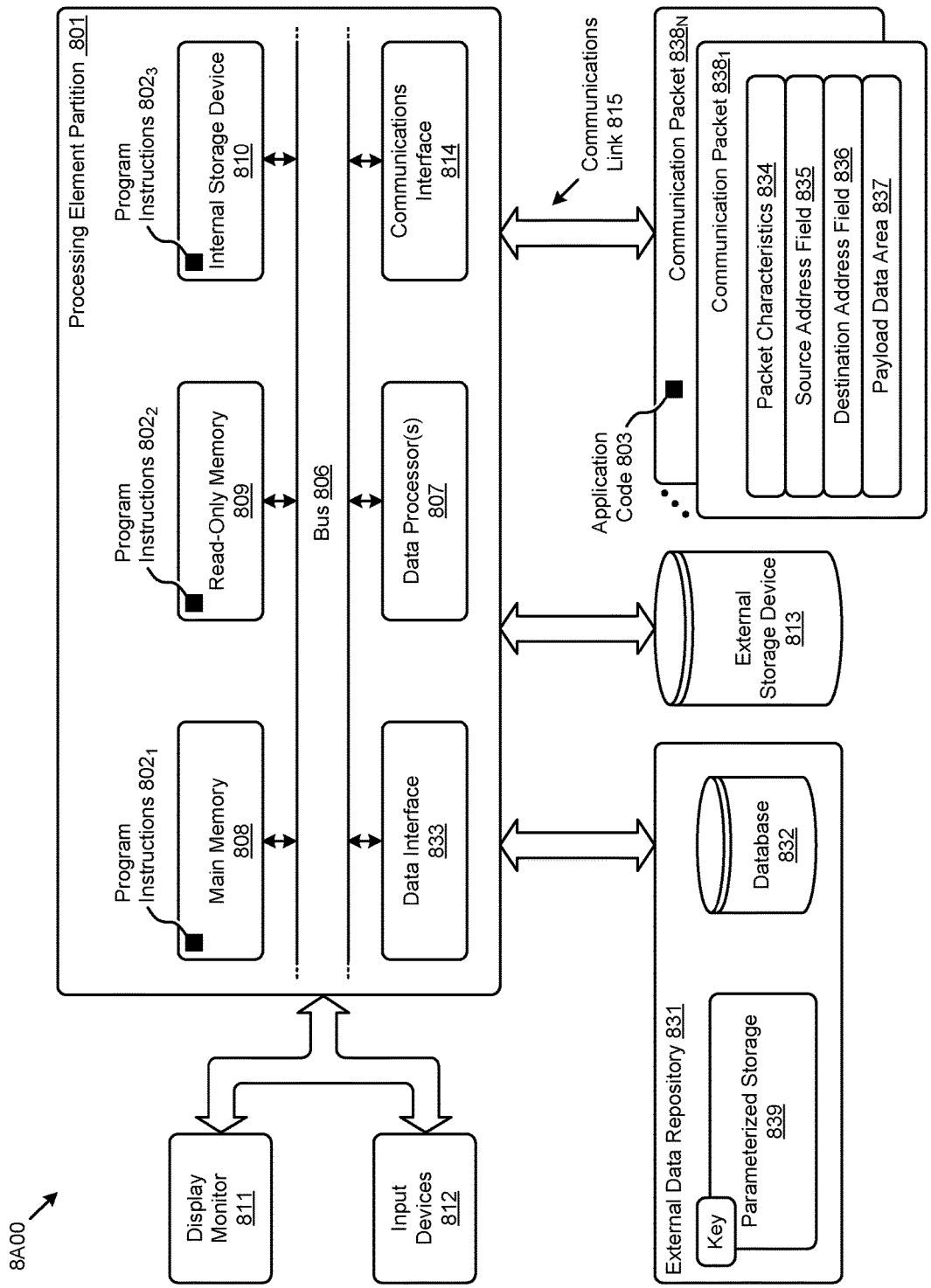
FIG. 8A and FIG. 8B present block diagrams of computer system architectures having components suitable for implementing embodiments of the present disclosure, and/or for use in the herein-described environments.

FIG. 8A depicts a block diagram of an instance of a computer system 8A00 suitable for implementing embodiments of the present disclosure. Computer system 8A00 includes a bus 806 or other communication mechanism for communicating information. The bus interconnects subsystems and devices such as a central processing unit (CPU), or a multi-core CPU (e.g., data processor 807), a system memory (e.g., main memory 808, or an area of random access memory (RAM)), a non-volatile storage device or non-volatile storage area (e.g., read-only memory 809), an internal storage device 810 or external storage device 813 (e.g., magnetic or optical), a data interface 833, a communications interface 814 (e.g., PHY, MAC, Ethernet interface, modem, etc.). The aforementioned components are shown within processing element partition 801, however other partitions are possible. The shown computer system 8A00 further comprises a display 811 (e.g., CRT or LCD), various input devices 812 (e.g., keyboard, cursor control), and an external data repository 831.

According to an embodiment of the disclosure, computer system 8A00 performs specific operations by data processor 807 executing one or more sequences of one or more program code instructions contained in a memory. Such instructions (e.g., program instructions $802_1$, program instructions $802_2$, program instructions $802_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 8A00 performs specific networking operations using one or more instances of communications interface 814. Instances of the communications interface 814 may comprise one or more networking ports that are configurable (e.g., pertaining to speed, protocol, physical layer characteristics, media access characteristics, etc.) and any particular instance of the communications interface 814 or port thereto can be configured differently from any other particular instance. Portions of a communication protocol can be carried out in whole or in part by any instance of the communications interface 814, and data (e.g., packets, data structures, bit fields, etc.) can be positioned in storage locations within communications interface 814, or within system memory, and such data can be accessed (e.g., using random access addressing, or using direct memory access DMA, etc.) by devices such as data processor 807.

The communications link 815 can be configured to transmit (e.g., send, receive, signal, etc.) any types of communications packets (e.g., communications packets $838_1$, communications packets $838_N$) comprising any organization of data items. The data items can comprise a payload data area 837, a destination address 836 (e.g., a destination IP address), a source address 835 (e.g., a source IP address), and can include various encodings or formatting of bit fields to populate the shown packet characteristics 834. In some cases the packet characteristics include a version identifier, a packet or payload length, a traffic class, a flow label, etc. In some cases the payload data area 837 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 807 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 831, which in turn can be formatted into any one or more storage areas, and which can comprise parameterized storage 839 accessible by a key (e.g., filename, table name, block address, offset address, etc.).

Execution of the sequences of instructions to practice certain embodiments of the disclosure are performed by a single instance of the computer system 8A00. According to certain embodiments of the disclosure, two or more instances of computer system 8A00 coupled by a communications link 815 (e.g., LAN, PTSN, or wireless network) may perform the sequence of instructions required to practice embodiments of the disclosure using two or more instances of components of computer system 8A00.

The computer system 8A00 may transmit and receive messages such as data and/or instructions organized into a data structure (e.g., communications packets). The data structure can include program instructions (e.g., application code 803), communicated through communications link 815 and communications interface 814. Received program code may be executed by data processor 807 as it is received and/or stored in the shown storage device or in or upon any other non-volatile storage for later execution. Computer system 8A00 may communicate through a data interface 833 to a database 832 on an external data repository 831. Data items in a database can be accessed using a primary key (e.g., a relational database primary key).

The processing element partition 801 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 807. Some embodiments include one or more special-purpose hardware components (e.g., power control, logic, sensors, transducers, etc.). A module may include one or more state machines and/or combinational logic used to implement or facilitate the operational and/or performance characteristics of file-agnostic data downloading in a virtual file system for a highly collaborative cloud-based environment.

Various implementations of the database 832 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of file-agnostic data downloading in a virtual file system for a highly collaborative cloud-based environment). Such files or records can be brought into and/or stored in volatile or non-volatile memory.

Figure 8B:
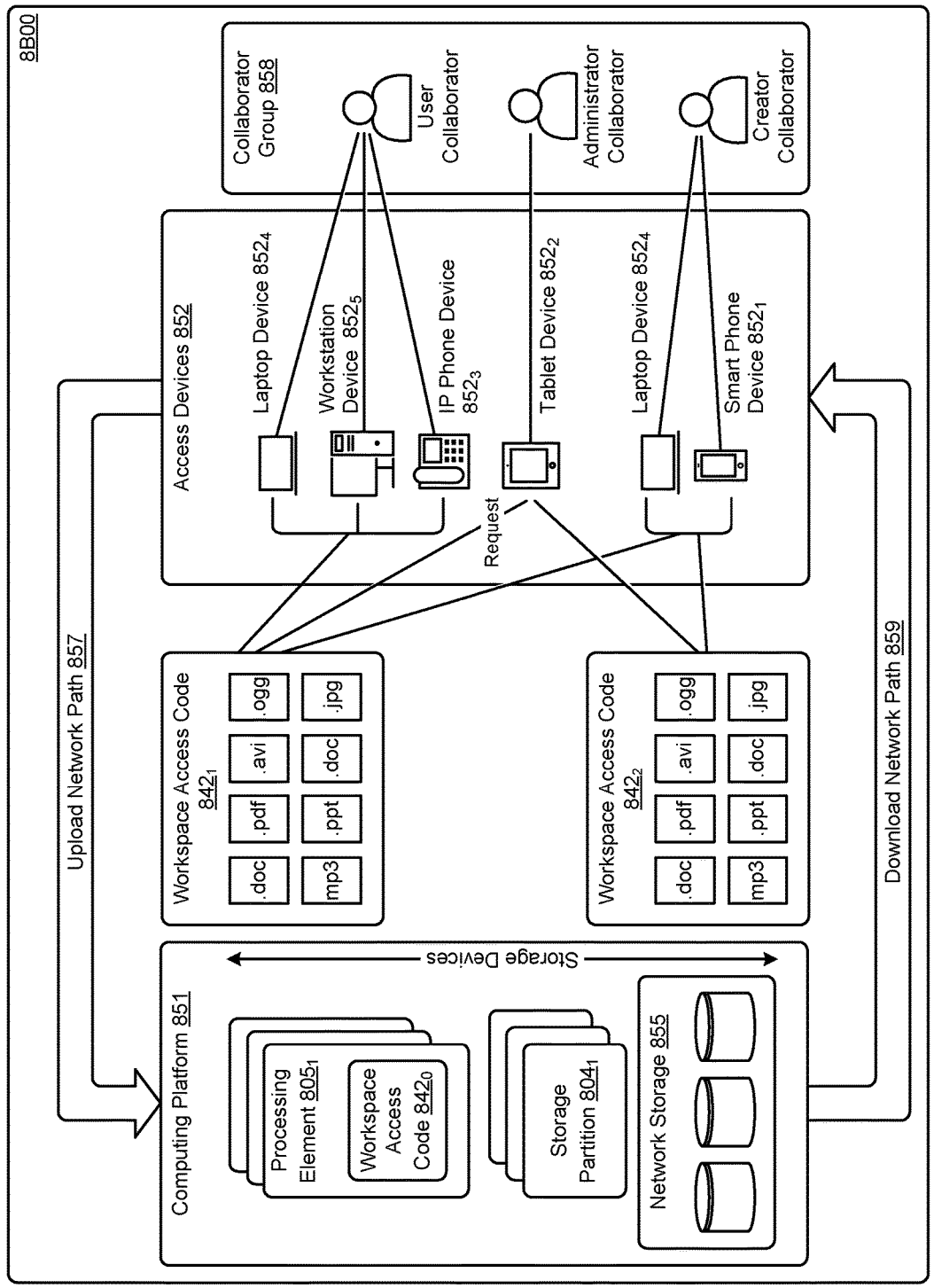

FIG. 8B depicts a block diagram of an instance of a cloud-based environment 8B00. Such a cloud-based environment supports access to workspaces through the execution of workspace access code (e.g., workspace access code $842_0$, workspace access code $842_1$, and workspace access code $842_2$). Workspace access code can be executed on any of the shown access devices 852 (e.g., laptop device $852_4$, workstation device $852_5$, IP phone device $852_3$, tablet device $852_2$, smart phone device $852_1$, etc.). A group of users can form a collaborator group 858, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. A portion of the workspace access code can reside in and be executed on any computing platform 851, including in a middleware setting. As shown, a portion of the workspace access code resides in and can be executed on one or more processing elements (e.g., processing element $805_1$). The workspace access code can interface with storage devices such as the shown networked storage 855. Storage of workspaces and/or any constituent files or objects, and/or any other code or scripts or data can be stored in any one or more storage partitions (e.g., storage partition $804_1$). In some environments, a processing element includes forms of storage such as RAM and/or ROM and/or FLASH, and/or other forms of volatile and non-volatile storage.

A stored workspace can be populated via an upload (e.g., an upload from an access device to a processing element over an upload network path 857). A stored workspace can be delivered to a particular user and/or shared with other particular users via a download (e.g., a download from a processing element to an access device over a download network path 859).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for:
    identifying a cloud-based environment, the cloud-based environment comprising at least a storage device storing a content object accessible by two or more users over a network;
    performing, for a first user from a first enterprise, a content-based encryption that generates a first copy of an encrypted file by encrypting the content object with a content-based encryption key, wherein the content-based encryption key is encrypted by a first enterprise-based encryption key;
    storing the first copy of the encrypted file at a cloud-based environment;
    performing, for a second user from a second enterprise, the content-based encryption that generates a second copy of the encrypted file by encrypting the content object with the content-based encryption key, wherein the content-based encryption key is encrypted by a second enterprise-based encryption key that is different from the first enterprise-based encryption key;

storing the second copy of the encrypted file at a cloud-based environment; and performing deduplication of the content object across multiple users that perform encryption, wherein the deduplication is performed based at least in part on at least one of, an intra-enterprise deduplicate directive, or an inter-enterprise deduplicate directive, wherein the at least one of the intra-enterprise deduplicate directive or the inter-enterprise deduplicate directive is accessed from metadata pertaining to a respective entity, wherein at least one deduplication directive is determined and the encrypted file is stored based at least in part on the at least one deduplication directive.

2. The method of claim 1, further receiving a designation from an enterprise to two or more entities for access to sets of files within the cloud-based environment wherein a first set of files are allocated to a first entity and wherein a second set of files are allocated to a second entity.

3. The method of claim 2, further comprising receiving an encrypted subject file to be added to the first set of the files that are allocated to the first entity.

4. The method of claim 1, further comprising storing at least one of, an enterprise key, the content-based encryption key, or an enterprise-based encrypted key, in object metadata.

5. The method of claim 4, further comprising:
decrypting, based at least in part on the enterprise key, the enterprise-based encrypted key to produce the content-based encryption key; and
decrypting, based at least in part on the content-based encryption key, the encrypted file to produce an unencrypted file.

6. The method of claim 1, further comprising:
receiving a collaboration invitation acceptance from at least one invitee from the entities;
provisioning file access by the invitee to a subject file, the file access characterized at least in part by an association between an invitee enterprise key and the subject file; and
encrypting, based at least in part on the invitee enterprise key, the content-based encryption key to produce an invitee enterprise-based encrypted key.

7. The method of claim 6, further comprising storing the invitee enterprise-based encrypted key in object metadata.

8. The method of claim 1, further comprising delivering, over a network, a virtual file system module to one or more user devices associated with the first user and the second user to access one or more of the files, wherein the virtual file system module performs at least one act of the method.

9. A computer readable medium, embodied in a non-transitory computer readable medium, the non-transitory computer readable medium having stored thereon a sequence of instructions which, when stored in memory and executed by a processor causes the processor to perform a set of acts for deduplication of a shared object in a cloud-based environment having with one or more storage devices that store one or more files that are accessible by two or more entities, the acts comprising:
identifying a cloud-based environment, the cloud-based environment comprising at least a storage device storing a content object accessible by two or more users over a network;

performing, for a first user from a first enterprise, a content-based encryption that generates a first copy of an encrypted file by encrypting the content object with a content-based encryption key, wherein the content-based encryption key is encrypted by a first enterprise-based encryption key;

storing the first copy of the encrypted file at a cloud-based environment;

performing, for a second user from a second enterprise, the content-based encryption that generates a second copy of the encrypted file by encrypting the content object with the content-based encryption key, wherein the content-based encryption key is encrypted by a second enterprise-based encryption key that is different from the first enterprise-based encryption key;

storing the second copy of the encrypted file at a cloud-based environment; and performing deduplication of the content object across multiple users that perform encryption, wherein the deduplication is performed based at least in part on at least one of, an intra-enterprise deduplicate directive, or an inter-enterprise deduplicate directive, wherein the at least one of the intra-enterprise deduplicate directive or the inter-enterprise deduplicate directive is accessed from metadata pertaining to a respective entity, wherein at least one deduplication directive is determined and the encrypted file is stored based at least in part on the at least one deduplication directive.

10. The computer readable medium of claim 9, further receiving a designation from an enterprise to two or more entities for access to sets of the files within the cloud-based environment wherein a first set of files are allocated to a first entity and wherein a second set of files are allocated to a second entity.

11. The computer readable medium of claim 10, further comprising instructions which, when stored in memory and executed by the processor causes the processor to perform acts of receiving an encrypted subject file to be added to the first set of the files that are allocated to the first entity.

12. The computer readable medium of claim 9, further comprising instructions which, when stored in memory and executed by the processor causes the processor to perform acts of storing at least one of, an enterprise key, the content-based encryption key, or an enterprise-based encrypted key, in object metadata.

13. The computer readable medium of claim 12, further comprising instructions which, when stored in memory and executed by the processor causes the processor to perform acts of: decrypting, based at least in part on the enterprise key, the enterprise-based encrypted key to produce the content-based encryption key; and decrypting, based at least in part on the content-based encryption key, the encrypted file to produce an unencrypted file.

14. The computer readable medium of claim 9, further comprising instructions which, when stored in memory and executed by the processor causes the processor to perform acts of: receiving a collaboration invitation acceptance from at least one invitee from the entities; and provisioning file access by the invitee to a subject file, the file access characterized at least in part by an association between an invitee enterprise key and the subject file; and
encrypting, based at least in part on the invitee enterprise key, the content-based encryption key to produce an invitee enterprise-based encrypted key.

15. A system for accessing a shared object in a cloud-based environment having one or more storage devices that store one or more files that are accessible by two or more entities, the system comprising:
- a storage medium having stored thereon a sequence of instructions; and
- a processor or processors that execute the instructions to cause the processor or processors to perform a set of acts, the acts comprising,
    - identifying a cloud-based environment, the cloud-based environment comprising at least a storage device storing a content object accessible by two or more users over a network;
    - performing, for a first user from a first enterprise, a content-based encryption that generates a first copy of an encrypted file by encrypting the content object with a content-based encryption key, wherein the content-based encryption key is encrypted by a first enterprise-based encryption key;
    - storing the first copy of the encrypted file at a cloud-based environment;
    - performing, for a second user from a second enterprise, the content-based encryption that generates a second copy of the encrypted file by encrypting the content object with the content-based encryption key, wherein the content-based encryption key is encrypted by a second enterprise-based encryption key that is different from the first enterprise-based encryption key;
    - storing the second copy of the encrypted file at a cloud-based environment; and
    - performing deduplication of the content object across multiple users that perform encryption, wherein the deduplication is performed based at least in part on at least one of, an intra-enterprise deduplicate directive, or an inter-enterprise deduplicate directive, wherein the at least one of the intra-enterprise deduplicate directive or the inter-enterprise deduplicate directive is accessed from metadata pertaining to a respective entity, wherein at least one deduplication directive is determined and the encrypted file is stored based at least in part on the at least one deduplication directive.

16. The system of claim 15, further receiving a designation from an enterprise to two or more entities for access to sets of the files within the cloud-based environment wherein a first set of files are allocated to a first entity and wherein a second set of files are allocated to a second entity.

* * * * *